(12) United States Patent
Eisenzopf

(10) Patent No.: US 10,896,670 B2
(45) Date of Patent: Jan. 19, 2021

(54) SYSTEM AND METHOD FOR A COMPUTER USER INTERFACE FOR EXPLORING CONVERSATIONAL FLOW WITH SELECTABLE DETAILS

(71) Applicant: Jonathan E. Eisenzopf, San Franciscso, CA (US)

(72) Inventor: Jonathan E. Eisenzopf, San Franciscso, CA (US)

(73) Assignee: discourse.ai, Inc., Dallas, TX (US)

( * ) Notice: Subject to any disclaimer, the term of this patent is extended or adjusted under 35 U.S.C. 154(b) by 0 days.

(21) Appl. No.: 16/786,923

(22) Filed: Feb. 10, 2020

(65) Prior Publication Data

US 2020/0175964 A1    Jun. 4, 2020

Related U.S. Application Data

(63) Continuation-in-part of application No. 16/734,973, filed on Jan. 6, 2020, which is a continuation-in-part (Continued)

(51) Int. Cl.
    *G10L 15/06* (2013.01)
    *G06F 16/9032* (2019.01)
    *G06F 16/901* (2019.01)

(52) U.S. Cl.
    CPC ........ *G10L 15/063* (2013.01); *G06F 16/9024* (2019.01); *G06F 16/90332* (2019.01); *G10L 2015/0638* (2013.01)

(58) Field of Classification Search
    USPC ..................................................... 704/1–504
    See application file for complete search history.

(56) References Cited

U.S. PATENT DOCUMENTS 6,587,844 B1 *  7/2003  Mohri ................... G10L 15/083
                                                     704/256
8,650,492 B1    2/2014  Mui et al.
                (Continued)

FOREIGN PATENT DOCUMENTS

WO    2014069122 A1    8/2014
WO    2018067368 A1    4/2018

OTHER PUBLICATIONS

Consumers Advocate; "Clientgo Chatbot Review ", retrieve don Dec. 17, 2019 from https://www.consumersadvocate.org.
(Continued)

*Primary Examiner* — Marcus T Riley
(74) *Attorney, Agent, or Firm* — Robert H. Frantz

(57) ABSTRACT

A system and method implemented on a computing device for visualizing, exploring and examining various levels of supporting information details, by the computer accessing a corpus having a plurality of digital weighted conversation models of text-based interlocutory conversations, including annotations, paths, and weights; selecting a plurality of the conversations according to at least one annotation value at least one weight threshold; and generating a graphical user interface using the selected plurality of text-based interlocutory conversations, in which interlocutor Goals are depicted starting points in a flow-graph, interlocutor Turns are depicted as intermittent points in the flow-graph, and flow pipes are depicted between each interlocutor Goal and each Turn, to illustrate one or more text-based interlocutory conversations which traversed a flow from each goal to each Turn, in which each flow pipe is rendered with a width relative to other flow pipes in the flow graph according the weights.

33 Claims, 25 Drawing Sheets

Related U.S. Application Data of application No. 16/210,081, filed on Dec. 5, 2018, and a continuation-in-part of application No. 16/201,188, filed on Nov. 27, 2018.

(60) Provisional application No. 62/594,616, filed on Dec. 5, 2017, provisional application No. 62/594,610, filed on Dec. 5, 2017.

(56) References Cited

U.S. PATENT DOCUMENTS

| | | | |
|---|---|---|---|
| 9,021,361 | B1 | 4/2015 | Pettinati et al. |
| 9,129,601 | B2 | 9/2015 | Stent et al. |
| 9,584,853 | B2 | 2/2017 | Frebourg et al. |
| 9,621,713 | B1 | 3/2017 | Gainsboro et al. |
| 9,740,677 | B2 | 8/2017 | Kim et al. |
| 10,452,783 | B2 | 10/2019 | Pasupalak et al. |
| 2007/0071206 | A1 | 3/2007 | Gainsboro et al. |
| 2009/0306981 | A1 | 12/2009 | Cromack et al. |
| 2014/0040312 | A1* | 2/2014 | Gorman ............... G06F 40/30 707/771 |
| 2014/0244249 | A1 | 8/2014 | Mohamed et al. |
| 2015/0066479 | A1* | 3/2015 | Pasupalak ............ G06F 40/20 704/9 |
| 2015/0081701 | A1 | 3/2015 | Lerios et al. |
| 2015/0186504 | A1* | 7/2015 | Gorman ............... G06F 40/30 707/752 |
| 2016/0063072 | A1 | 3/2016 | N et al. |
| 2016/0357402 | A1 | 12/2016 | Matas et al. |
| 2017/0039233 | A1 | 2/2017 | Gauthier et al. |
| 2017/0039244 | A1 | 2/2017 | Gauthier et al. |
| 2017/0039576 | A1 | 2/2017 | Gauthier et al. |
| 2017/0039577 | A1 | 2/2017 | Gauthier et al. |
| 2017/0098318 | A1 | 4/2017 | Iannaccone et al. |
| 2018/0143967 | A1 | 5/2018 | Anbazhagan et al. |
| 2019/0043106 | A1 | 2/2019 | Talmor et al. |
| 2019/0171712 | A1 | 6/2019 | Eisenzopf |
| 2019/0188590 | A1 | 6/2019 | Wu et al. |
| 2019/0236464 | A1* | 8/2019 | Feinson ............... G06N 3/006 |
| 2019/0243916 | A1* | 8/2019 | Ashoori ............... G06F 40/00 |
| 2019/0272323 | A1* | 9/2019 | Galitsky ............ G06F 40/205 |
| 2019/0311036 | A1 | 10/2019 | Shanmugam et al. |
| 2020/0004813 | A1* | 1/2020 | Galitsky ............ G06F 16/9538 |
| 2020/0143288 | A1* | 5/2020 | Eisenzopf ............... H04L 51/02 |
| 2020/0175964 | A1* | 6/2020 | Eisenzopf .......... G06F 16/9024 |

OTHER PUBLICATIONS

Consumers Advocate; "10 Best Chatbots of 2020", retrieved on Dec. 17, 2019 from https://www.consumersadvocate.org.
Consumers Advocate; "Botique.ai Review", retrieved on Dec. 17, 2019 from https://www.consumersadvocate.org.
Consumers Advocate; "Ada Chatbot Review", retrieved on Dec. 17, 2019 from https://www.consumersadvocate.org.
Consumers Advocate; "LiveChat Chatbot Review", retrieved on Dec. 17, 2019 from https://www.consumersadvocate.org.
Consumers Advocate; "Amzaon Lex Chatbot Review", retrieved on Dec. 17, 2019 from https://www.consumersadvocate.org.
Consumers Advocate; "Bold Chatbot Review", retrieved on Dec. 17, 2019 from https://www.consumersadvocate.org.
Consumers Advocate; "IBM Watson API Chatbot Review", retrieved on Dec. 17, 2019 from https://www.consumersadvocate.org.
Consumers Advocate; "Hubspot Chatbots Review", retrieved on Dec. 17, 2019 from https://www.consumersadvocate.org.
Consumers Advocate; "Heyday Chatbots Review", retrieved on Dec. 17, 2019 from https://www.consumersadvocate.org.
Consumers Advocate; "Dialogflow Chatbot Review", retrieved on Dec. 17, 2019 from https://www.consumersadvocate.org.
Consumers Advocate; "Reve Chatbot Review", retrieved on Dec. 17, 2019 from https://www.consumersadvocate.org.
Deshpande; "How I used deep learning to train a chatbot to talk like me (sorta)", retrieved on Dec. 17, 2019 from https://adeshpande3.github.io.
Udemy; "Deep Learning and NLP A-Z [TM]: How to create a ChatBot", retrieved on Dec. 17, 2019 from https://www.udemy.com.
Sutskever, Hya, et al.; "Sequence to Sequence Learning with Neural Networks", NIPS'14: Proceedings of the 27th International Conference on Neural Information Processing Systems, Dec. 2014, vol. 2, pp. 3104-3112.
Drift; "An introduction to A.I. Chatbots", retrieved from https://www.drift.com/learn/chatbot/ai-chatbots/ on Dec. 17, 2019.
Knight, Chris; "How to teach your chatbot with training data"; Mar. 23, 2018, retrieved on Dec. 17, 2019 from https://chatbotslife.com.
Machine Translation (partial) of WO2014069122A1 retrieved from http://patents.google.com/patent on Sep. 7, 2018.
Ang, J., et al.; "Automatic Dialog Act Segmentation and Classification in Multiparty Meetings,"; date unknown.
Dunne, J. et al.; "Hello & Goodbye: Conversation Boundary Identification Using Text Classification"; 2018.
Galley, M. et al.; "Discourse Segmentation of Multi-Party Conversation"; date unknown.
Garreta, Raul; How to create text classifiers with Machine Learning, retrieved on Sep. 7, 2018 from https://monkeylearn.com/blog.
Hsueh, P-Y. et al; "Automatic Segmentation of Multiparty Dialogue"; date unknown.
Joty, S. et al.; "Topic Segmentation and Labeling in Asynchronous Conversations"; 2013.
Joty, S. et al.; "Supervised Topic Segmentation of Email Conversations"; 2011.
Michiels, Eric; "Modelling Chatbots with a Cognitive System Allows for a Differentiating User Experience"; 2017.
Olofsson, N. et al.; "A Machine Learning Approach to Dialogue Act Classification in Human-Robot Conversations"; date unknown.
Morchid, M. et al.; "Improving Dialogue Classification using a Topic Space Representation and a Gaussian Classifier Based on the Decision Rule"; date unknown.
Purver, M.; "Topic Segmentation", date unknown.
Ries, K.; "Segmenting Conversations by Topic, Initiative and Style"; 2001.
Roth, Ben.; "Topic Extraction and Relation in Instant Messaging"; 2010.
Stewart, Robin S.; "Automatic Identification of Off-Topic Regions of Conversations"; 2006.
Weisz, Justin; "Segmentation and Classification of Online Chats"; date unknown.
Wikipedia; "Dialog act"; retrieved on Sep. 18, 2018 from https://en.wikipedia.org/wiki/Dialog_act.
Bostock, Mike. "Data-Driven Documents", copyright 2019.
Maasch, et al.; "Conversation Trainings—Towards a Multidimensional Visualization of Learning Flows"; publication date May 2018.
Holtz, Yan; "Most basic Sankey diagram in d3.js"; copyright 2018.
Honold, Allison; "The What, Why, and How of Sankey Diagrams"; retrieved from https://towardsdatascience.com/the-what-why-and-how-of-sankey-diagrams on Jan. 9, 2020.
Netz, et al.; "Visual Awesomeness Unlocked—Sankey diagram"; Dec. 11, 2015.
sankey-diagram.com; "Sankey diagram from cement production"; Nov. 15, 2018.
sankey-diagram.com; "Sankey Definitions"; Apr. 12, 2007.
sankey-diagram.com; "Energy Recovery from Process Air"; Mar. 26, 2009.
"Proceedings at the PTAB: This is a Sankey of PTAB Petitions to Date"; retrieved from on Jan. 9, 2020.

* cited by examiner

SYSTEM AND METHOD FOR A COMPUTER USER INTERFACE FOR EXPLORING CONVERSATIONAL FLOW WITH SELECTABLE DETAILS

This non-provisional continuation-in-part patent application claims benefit of the filing dates of U.S. non-provisional patent application Ser. No. 16/734,973, which was filed on Jan. 6, 2020, entitled, "Training of Chatbots from Corpus of Human-to-Human Chats", which was a continuation-in-part of two US Patent Applications:
  (1) Ser. No. 16/201,188, which was filed on Nov. 27, 2018, entitled "Improvements to Computer-based Interlocutor Understanding Using Classifying Conversation Segments," and
  (2) Ser. No. 16/210,081, which was filed on Dec. 5, 2018, entitled "Improvements to Computer-based Understanding of Customer Behavior Patterns for Better Customer Outcomes",
which claimed benefit of the filing dates of U.S. provisional patent applications, respectively:
  (3) 62/594,610, filed on Dec. 5, 2017, and
  (4) 62/594,616, filed on Dec. 5, 2017, respectively, all filed by Jonathan E. Eisenzopf. The present invention relates to certain improvements of computer functionality to training automated chatbots based on a corpus of historical, recorded human-to-human text-based interactions.

FIELD OF THE INVENTION

Background of Invention

Online conversational text-based communication and interaction systems are growing in popularity as clients of business entities expect to be able to "chat" with business representatives via websites and smartphone application programs at any time of day, any day of the week, any time of year. It was estimated by consulting firm Deloitte in 2017 that 76% of customer interactions occur through conversations, but that 50% of those conversations fail to meet customer expectations, which was estimated to result in $1.6 trillion lost in global revenue annually due to the poor customer experience from these conversations according to the eleventh annual Accenture Global Consumer Pulse Survey in 2016.

It is expected by some industry analysts that Artificial Intelligence (AI) can be leveraged to automate a large portion of these conversations, especially through chatbot platforms. The McKinsey Global Institute predicted in 2018 that AI-based conversation platforms that utilize manually supervised deep-learning technology with training from at least 10 million labeled conversation examples would match or exceed the success rate of human-to-human conversations.

SUMMARY OF THE EXEMPLARY EMBODIMENTS OF THE INVENTION

A system and method implemented on a computing device is disclosed for interactively, which user-controllable levels of details, visualizing, exploring and examining various levels of supporting information details, by the computer accessing a corpus having a plurality of digital weighted conversation models of text-based interlocutory conversations, including annotations, paths, and weights; selecting a plurality of the conversations according to at least one annotation value at least one weight threshold; and generating a graphical user interface using the selected plurality of text-based interlocutory conversations, in which interlocutor Goals are depicted starting points in a flow-graph, interlocutor Turns are depicted as intermittent points in the flow-graph, and flow pipes are depicted between each interlocutor Goal and each Turn, to illustrate one or more text-based interlocutory conversations which traversed a flow from each goal to each Turn, in which each flow pipe is rendered with a width relative to other flow pipes in the flow graph according the weights.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF ONE OR MORE EXEMPLARY EMBODIMENT(S) OF THE INVENTION

Figure 1:
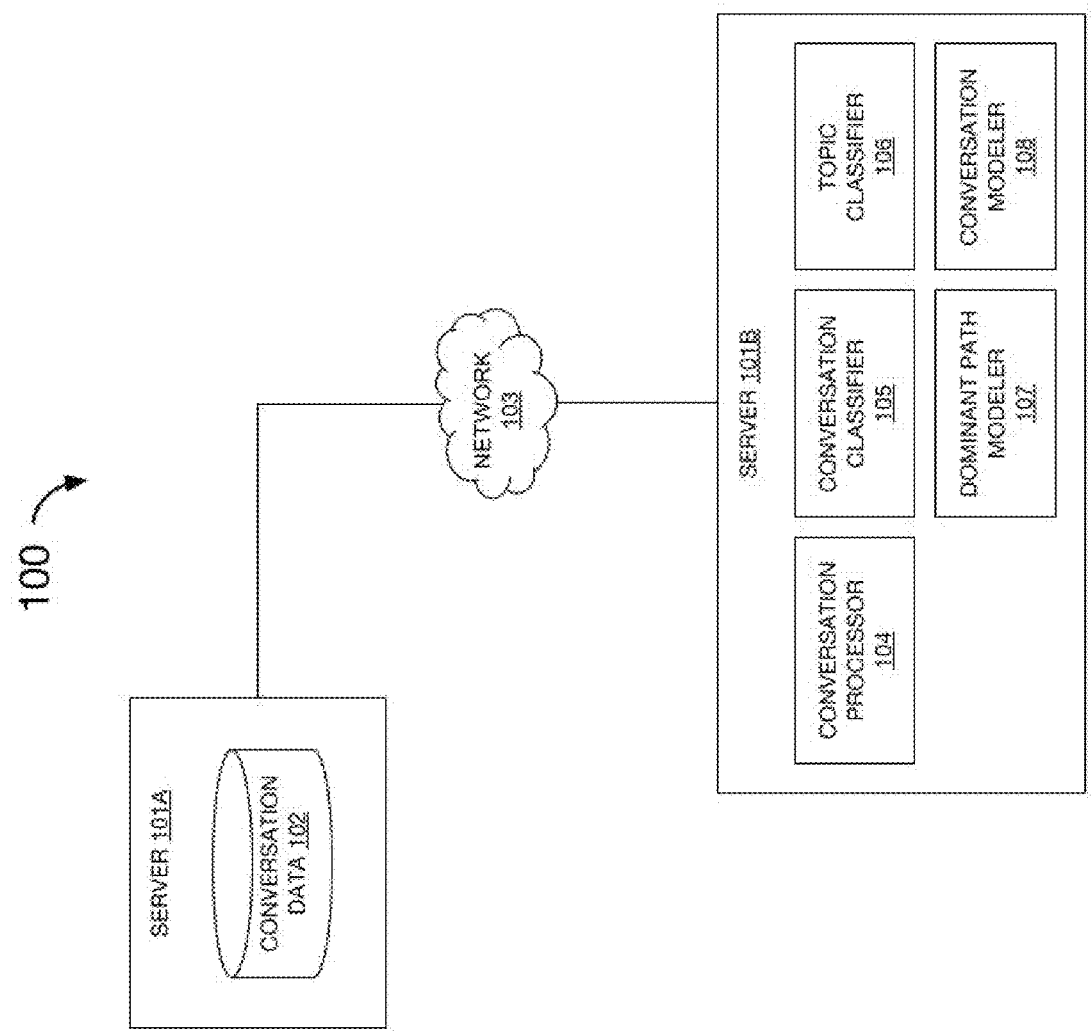
FIG. 1 depicts an improved data processing system and its related components according to at least one embodiment of the invention disclosed in the related and incorporated U.S. patent application Ser. No. 16/201,188.

The present inventor(s) have recognized that existing tools and systems available in the art for exploring large collections ("corpora") of digitally recorded conversations, such as two-interlocutor text messages ("chat" conversations) a lacking in functionality, and do not promote insightful discovery of the most common goals, patterns, flows and results of those collections of conversations. Therefore, per the inventors' recognition of this unmet need in the relevant arts, the inventors have set out to develop a more efficient technology to visually explore a such large corpus in a manner which promotes identification of the most dominant conversational paths represented in the corpus in order to select the most common goals, patterns, flows and results for training of automated communication systems in which one interlocutor is a human user and the other interlocutor is an Artificial Intelligence-based (AI-based) automated conversational agent system including, but not limited to, chatbots, interactive voice response (IVR) systems, voicebot, prompts, entities, slots and flows. For the purposes of this disclosure, example embodiments of the present invention will be set forth relative to realization for training AI-based automated chatbots, however, those ordinarily skilled in the art will recognized that the invention is not limited to this type of training and can equally well be used to train other AI-based automated conversation agent systems.

The related and incorporated two patent applications provide useful technologies and processes to accomplish some of this functionality, so the teachings of those two patent applications are reviewed in the following paragraphs prior to delving into details of training chatbots using a corpus of interpersonal conversations. It should be noted, however, that although the present invention is disclosed in relationship to these two related patent applications, other embodiments of the present invention may be realized using similar functionality and similar data output from other products and systems, and that the present invention is not limited to utilization with and integration to only systems that implement the inventions described in the two related and incorporated patent applications.

Conversation Segment Classification

At least one of the present inventors realized, as disclosed in the related and incorporated U.S. patent application Ser. No. 16/201,188, hereinafter referred to as the '188 related invention or '188 related patent application, that there was an unmet need in the art of computing and user interfaces to enable a conversational interface through a digital virtual assistant such as a Chat Bot (automated text chat process). Certain improvements were disclosed in the related and incorporated U.S. patent application Ser. No. 16/201,188 that improved the ease of use of such user interfaces while simultaneously improving the utilization of computing resources such as memory footprint, processing bandwidth, and communications bandwidth to yield higher levels of simultaneously-served users by a single computing platform, thereby reducing the cost of the service to the operator.

The '188 related invention provides certain enhancements and improvements to a data processing system that processes audio, text and/or visual input for a computer interlocutor by creating and using a computer-based and computer-maintained conversation model comprising a plurality of topics comprising a plurality of probable inputs and outputs of a conversation based on a plurality of recorded conversations between a plurality of interlocutors.

The computer interlocutor, according to the '188 related invention, resides on a computer with attached storage and memory that contains one or more processing units. The computer interlocutor creates responses displayed via an output mechanism such as a an attached computer monitor or embedded visual screen or audio speaker attached to or embedded in the computer or computing device based on matching user inputs from an input device such as a connected keyboard or microphone attached to a computer or computing device.

Computer-based natural language understanding of input and output for a computer interlocutor is improved using a method, disclosed herein, of classifying conversation segments, which includes one or more of the following computer-performed actions, steps or processes:

a. receiving conversation data from transcribed conversations, such as between two people, an online chat or a text messaging system, a speech recognition system, or a chatbot or voicebot system;
b. splitting transcribed conversations into groups related to a conversation ontology using metadata; identifying dominant paths of conversational behavior by counting the frequency of occurrences of the behavior for a given path;
c. creating a conversation model comprising conversation behaviors, metadata, and dominant paths;
d. using the conversation model to assign a probability score for a matched input to the computer interlocutor or a generated output from the computer interlocutor.
e. receiving a plurality of transcribed conversations comprising a plurality of topics comprising a plurality of inputs and outputs by the interlocutors;
f. accessing and using for rule-based decision making a plurality of metadata related to a plurality of conversations, topics, interlocutors, or related computer systems;
g. receiving conversation data from transcribed conversations between one or more of people, an online chat or a text messaging system, a speech recognition system, and a chatbot or voicebot system (in some embodiments, some users' paths may be given more weight than other users);
h. splitting a plurality of transcribed conversations into a plurality of groups related to a conversation ontology using a plurality of metadata;
i. identifying a plurality of dominant paths comprising a plurality of conversational behavior by counting the frequency of occurrences of said behavior for a given path;
j. creating a conversation model comprising plurality of conversation behaviors, metadata, and dominant paths; and
k. accessing and using for rule-based decision making the conversation model to assign a probability score for a matched input to the computer interlocutor or a generated output from the computer interlocutor.

Referring now to FIG. 1, an exemplary improved networked computer environment 100 is depicted according to the '188 related invention. The conversation classifier server 101B is connected to a network 103 and configured such that is it capable of storing and running one or more of the following: a conversation processor 104, a conversation classifier 105, a topic classifier 106, a dominant path modeler 107, and a conversation modeler 108, each of which may be realized by a processor running computer instructions, specialized electronic hardware circuits, or a combination of both. In this exemplary embodiment, another computer 101A is also connected to the computer communications network 103 and contains conversation data 102, which consists of transcribed conversations between two or more human and/or computer interlocutors. In some embodiments, at least one of the interlocutors may be interfaced via an application programming interface (API). In some embodiments, all of the interlocutors may be conducting a dialog within one computer.

Figure 2:
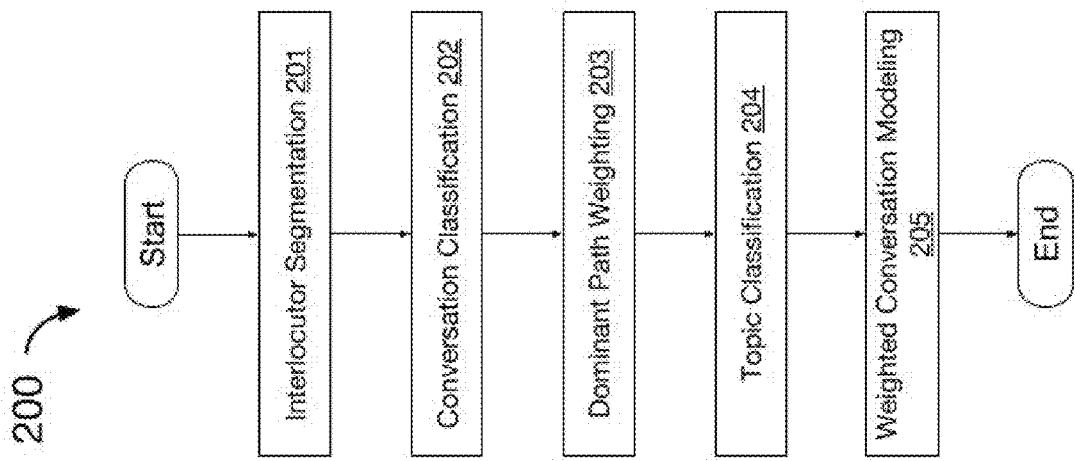
FIG. 2 depicts one or more methods according to the invention disclosed in the related and incorporated U.S. patent application Ser. No. 16/201,188 performed by the improved data processing system to classify a plurality of conversation transcriptions between two or more interlocutors.

Referring now to FIG. 2, exemplary methods used by the data processing system 100 to classify a plurality of conversation transcriptions from conversation data 102 between two or more interlocutors 200 are set forth further reference the exemplary arrangement of computing systems as shown in FIG. 1. The first step of the process is to segment the conversation transcript into turns further categorized by interlocutor 201 which is performed, for example, by the conversation processor 104 and further illustrated in FIG. 3.

The conversation is further classified 202 according to a conversation ontology 700 according to conversation class 304. In at least one embodiment, the segmenting of a conversation transcript may be performed manually, according to the conversation ontology described herein, or may be performed at least if not entirely automatically using available third-party dialog act processing systems with suitable control parameters.

Next, conversations are weighted 203 according to the number of path traversals, which is performed, for example, by the dominant path modeler 107. Following the previous step, the data processing system performs topic classification 204 using the topic classifier 106. Topic classification can be performed automatically (unsupervised) using techniques such as keyword analysis thesauri, and natural language processing. Finally, the improved data processing system creates 205 a weighted conversation model 600 as further illustrated by FIG. 6 which can be used by a plurality of computer interlocutor systems to improve input and output performance in a number of ways, including but not limited to:

(a) allowing for predictive responses by automated systems in order to handle transactions faster, thereby reducing the computer resources consumed by aggregate transactions and allowing more transactions to by handled by the same amount of hardware;
(b) supporting optimized product design and upgrades by identifying and automating the most likely conversation behaviors to target in resource reduction (decrease response time, reduce memory footprint, reduce processor burden, reduce communications bandwidth, etc.); and
(c) increasing customer affinity for interacting with automated systems by reducing delays between conversation turns which are otherwise unnatural delays when two humans are conversing.

Figure 3:
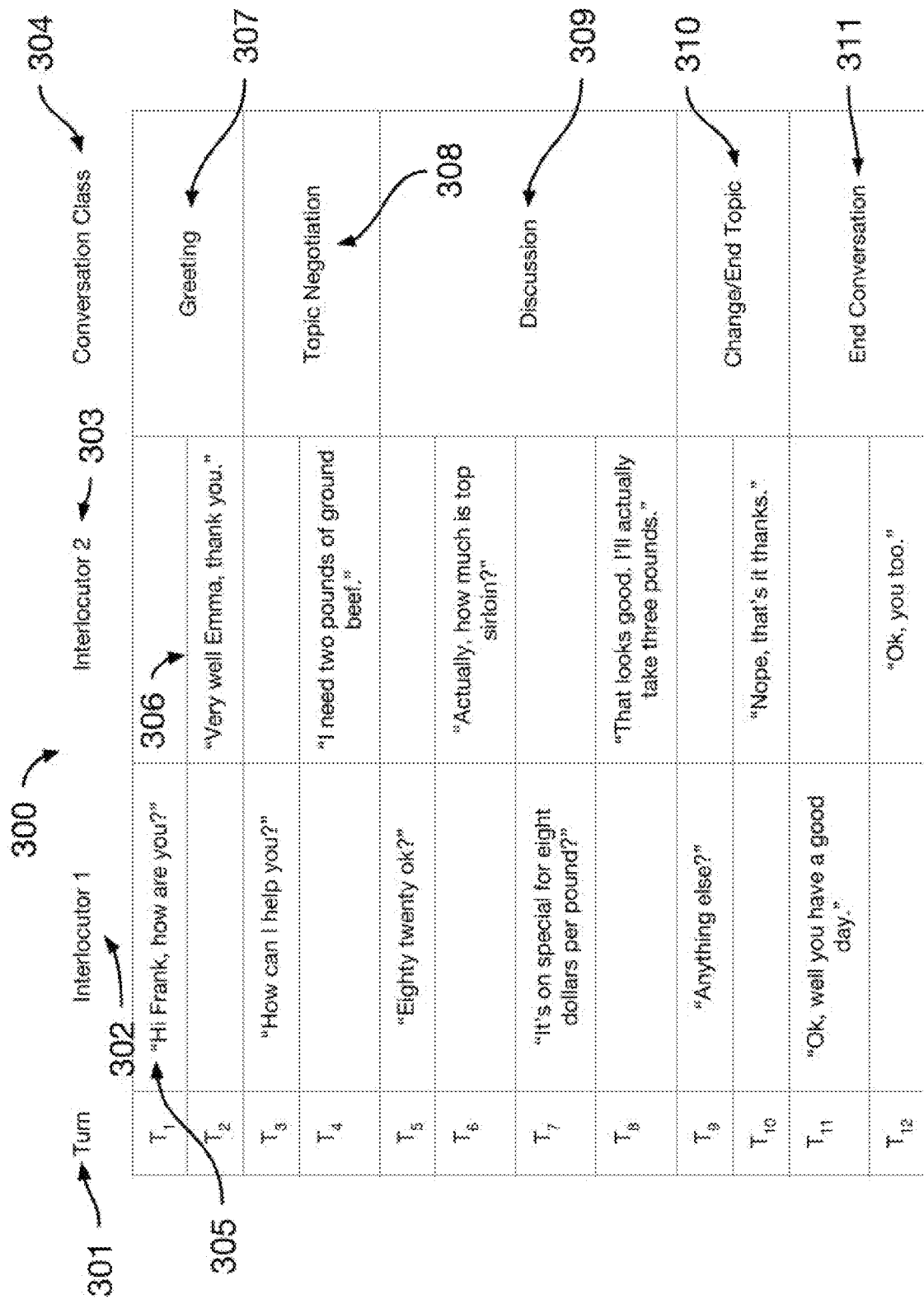
FIG. 3 illustrates an exemplary conversation classification method including splitting a plurality of transcribed conversations between multiple interlocutors into a plurality of conversation segments.

FIG. 3 illustrates an exemplary embodiment 300 of a method for a dominant path weighting 203 and output of the conversation classifier 105. This example includes a series of conversation turns $T_1$-$T_{12}$ 301 by an interlocutor 302 and another interlocutor 303 and further classified into conversation classes 304 which correspond to a conversation ontology 700 as further illustrated in FIG. 7.

The conversation classifier 105 works by examining the text from the interlocutor 305 comprising a turn 301 and further examines the second interlocutor's text 306, which, together and with processing of subsequent text including the turns of the interlocutors, classifies the turns into a conversation class 304. Illustrative of this figure, the conversation classes are greeting 307, topic negotiation 308, discussion 309, change/end topic 310, and end conversation 311.

Figure 4:
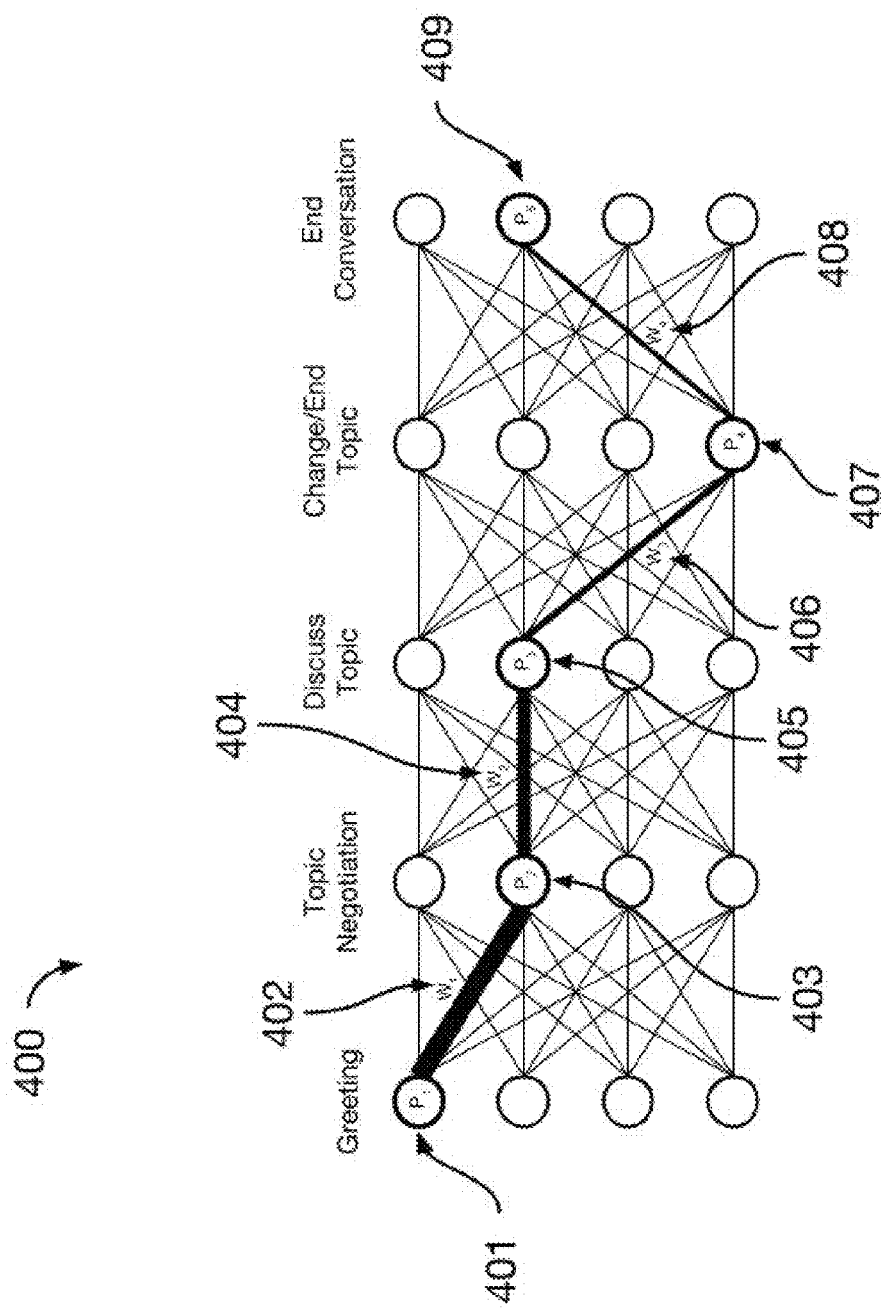
FIG. 4 shows an exemplary embodiment of a method for dominant weighting for a dominant path modeler.

FIG. 4 shows, using a Sankey-like diagram, an exemplary 400 dominant weighting method 203 used, for example, by the dominant path modeler 107 of data processing system 100 based on a plurality of segmented transcribed conversations processed by, for example, the conversation classifier 105 as depicted in FIG. 3. FIG. 4 further illustrates a highlighted dominant path example as produced by the dominant weighting method 203 comprised of a plurality of classified conversations 300. The dominant path model 400 is created, for example, by the dominant path modeler 107. Each step in the dominant path may be representative of a conversation class (304), an interlocutor input, or additional metadata identified by the dominant path modeler. FIG. 4 illustrates a dominant path model and may include a greeting 401, a topic negotiation 403, a topic discussion 405, a change or end of topic 407, and an end of conversation 409 steps (path nodes). The illustrated lines between each element of the dominant path represent the sum of plurality of conversations that traverse each path. The lines or weights (402, 404, 406, and 408) between steps in the paths represent the sums $W_1$-$\underline{W}_N$ of traversals between steps in the dominant path.

Figure 5:
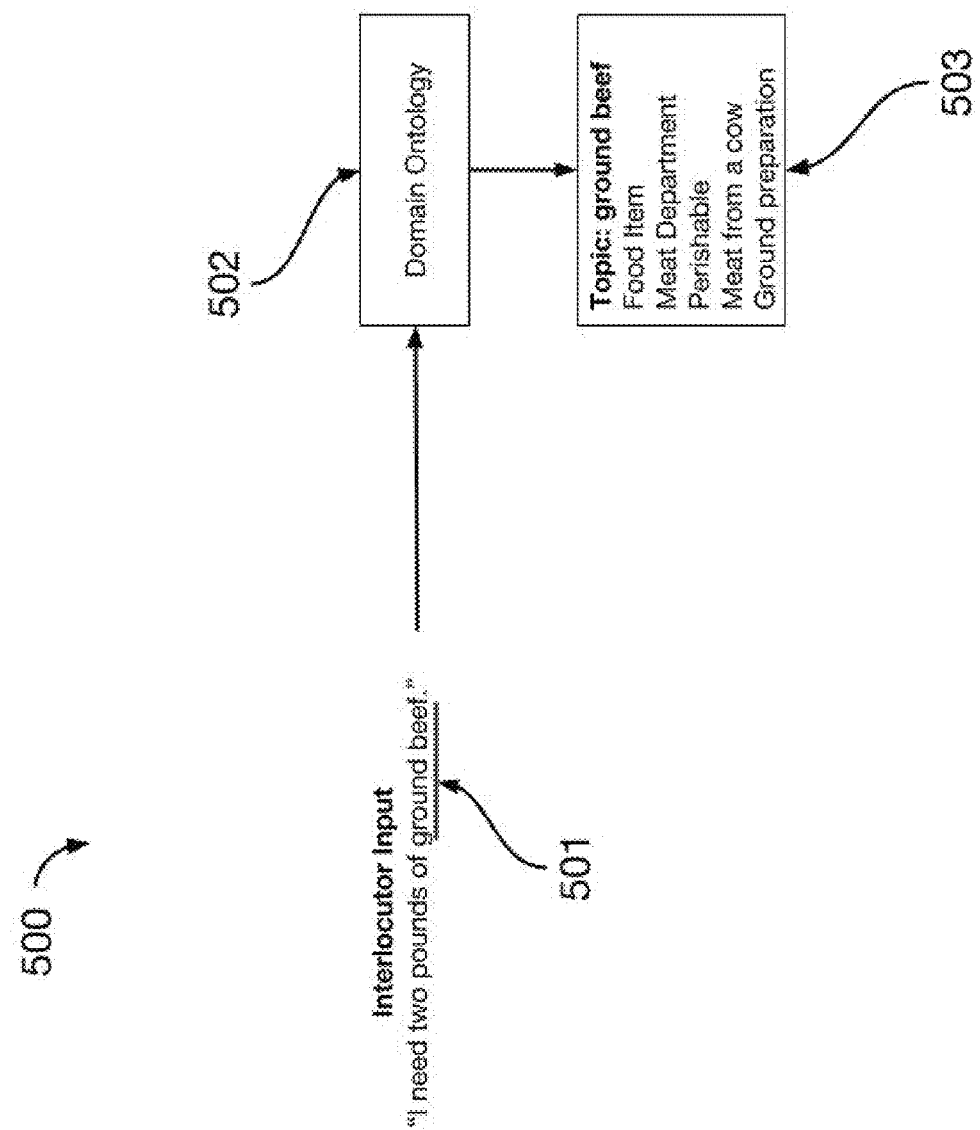
FIG. 5 illustrates an exemplary topic classification method used by a topic classifier to identify the correct topic of conversation.

FIG. 5 depicts 500 an exemplary topic classification method 204 used, for example, by the topic classifier 106 of data processing system 100, and is used to identify the correct topic of conversation based on a plurality of segmented conversations 300 including a plurality of topic negotiation segments 308. FIG. 5 further includes matching interlocutor inputs 501 to a plurality of topics in a plurality of domain ontologies 502 which returns the resulting metadata associated with a plurality of matching topics 503 to, for example, the topic classifier 106.

Figure 6:
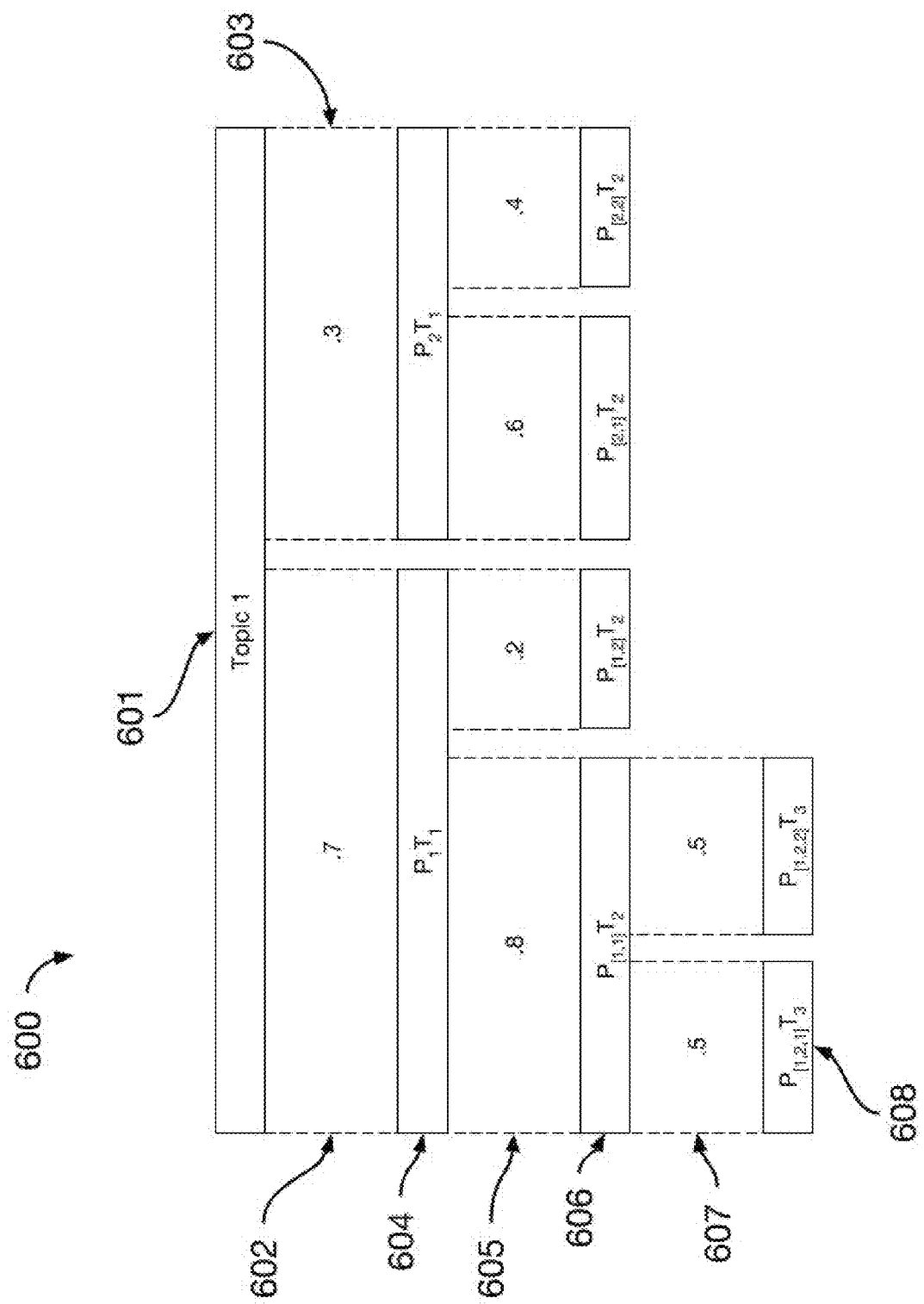
FIG. 6 depicts an exemplary weighted conversation model using a weighted conversation model.

FIG. 6 depicts an exemplary weighted conversation model 600 which is recorded in computer memory in an improved data structure and produced, for example, by the conversation modeler 108 of the data processing system 100, using, for example, the weighted conversation modeling method 205 from a plurality of transcribed conversations for a plurality of identified topics 500. FIG. 6 is illustrative of the weighted conversation modeling method 205 which is produced by the conversation modeler 108 and includes a topic 601 and a plurality of weights 602, 603, 605, 607 associated with a plurality of conversation paths and turns 604, 606, 608. The method of the '188 related invention uses the output of, for example, the dominant path modeler 107 and its associated dominant path weighting method 203 and as previously illustrated in FIG. 4 as input.

Each path segment $P_1$-$P_N$ between turns $T_1$-$T_N$ from a given dominant path model 400 and its associated weights $W_1$-$W_N$ are converted to a corresponding weight in the conversation model 600 such that the percentage of conversation traversals are represented as a percentage of the total traversals from the plurality of processed conversations.

For this present illustration, given a topic 601, weight 602 represents the percentage of processed conversations that have traversed the path $P_x$ for the interlocutor turn $T_y$. Further, weight 603 represents a second dominant path weighting with its associated path and interlocutor turn. Further weights for turns by the interlocutors are similarly represented by 605, 606, 607, and 608 as prescribed by the conversation segments, paths and weights contained in the dominant path model 400. The resulting conversation model as illustrated by FIG. 6 and its associated weights can then be used as by a method to predict the next most likely step in a conversation based upon the current position in the conversation model.

Figure 7:
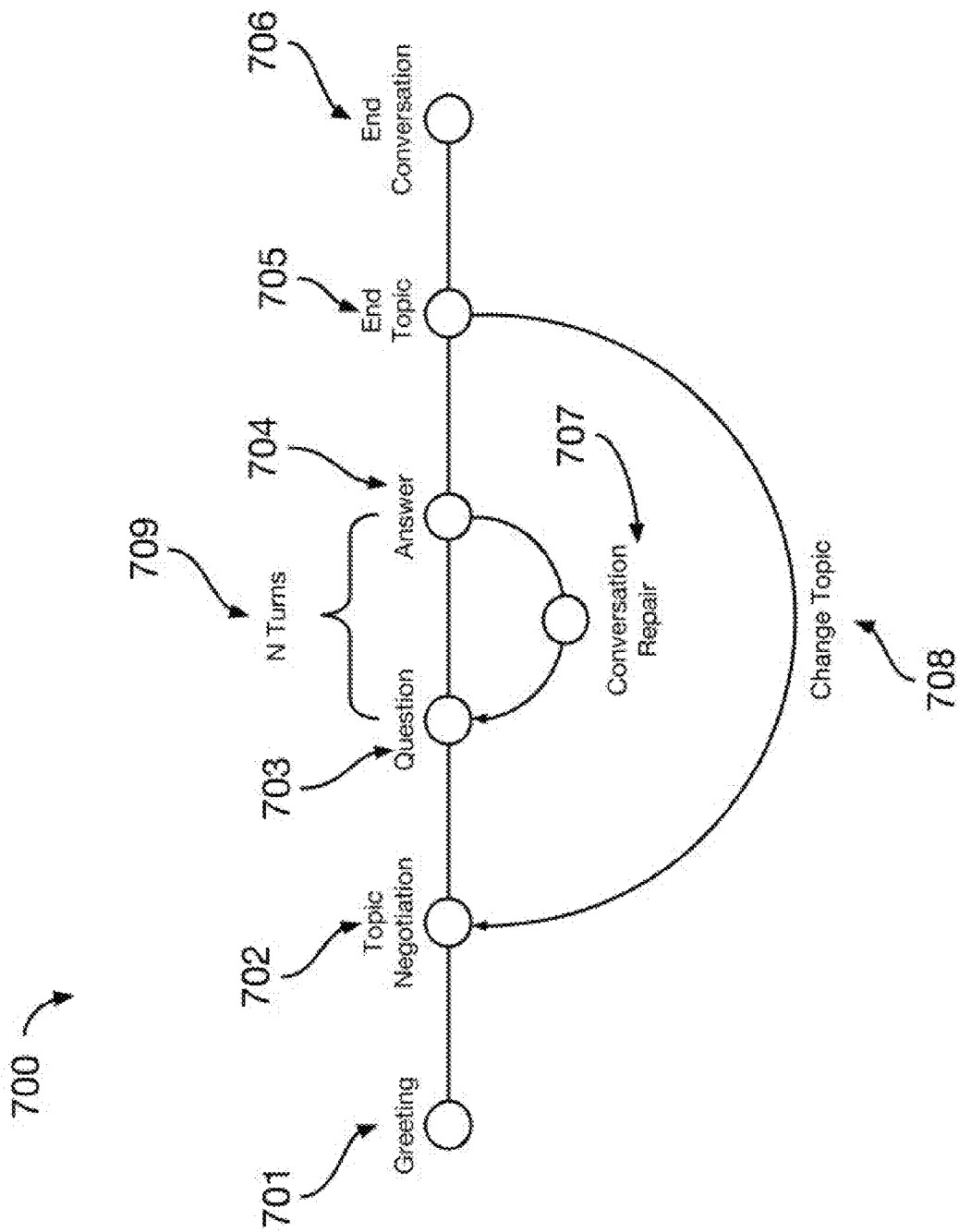
FIG. 7 sets forth an exemplary conversation ontology used to for rule-based decision making to split transcribed conversations into segments for classification by the improved data processing system as disclosed in the related and incorporated U.S. patent application Ser. No. 16/201,188.

Referring now to FIG. 7, an exemplary conversation ontology is shown using a steampipe-like diagram, which may consist of entities including a greeting 701, topic negotiation 702, a discussion about a topic comprised of a series of turns 709 between the interlocutors that may contain a corresponding question 703 and answer followed by an end 705 or change of topic 708 followed by an end of conversation 706. Conversation repair 707 occurs within a topic when one or both interlocutors exchange turns during which the initial or earlier topic is finetuned or further refined, but not entirely changed from one domain to another. A plurality of conversation ontologies may be used by the data processing system 100 and one or more of the corresponding methods 200 of the system. Further, an ontology 700 is specifically utilized by the conversation classifier 105 and the associated method conversation classification 203 and as further illustrated by FIG. 3 to segment a plurality of conversations into conversation classes 304.

Figure 8:
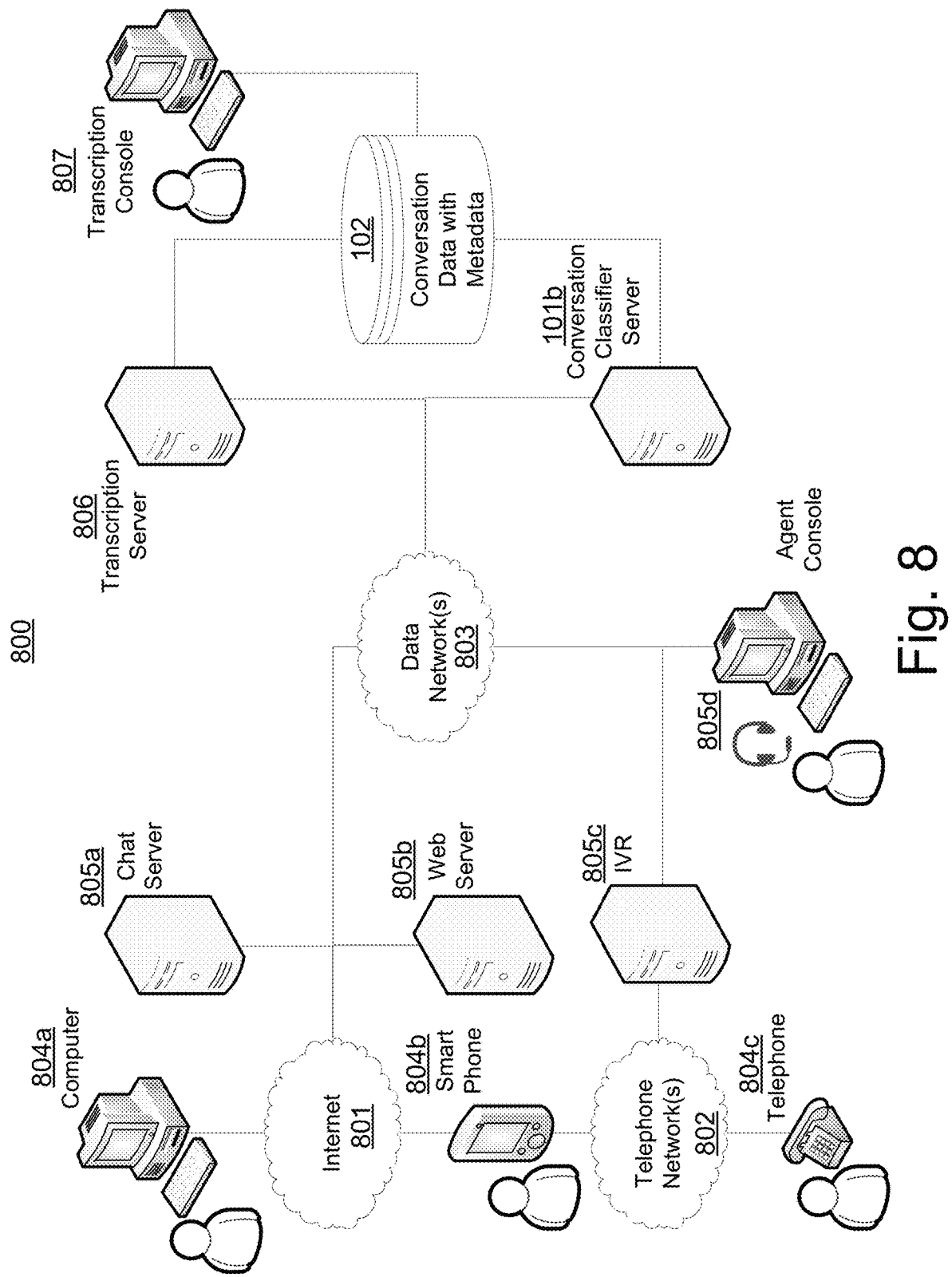
FIG. 8 illustrates an exemplary arrangement of computers, devices, and networks according to at least one embodiment of the invention disclosed in the related and incorporated U.S. patent application Ser. No. 16/201,188.

Referring now to FIG. 8, an exemplary arrangement 800 of computers, devices, and networks according to at least one embodiment of the '188 related invention is shown. A variety, but not exhaustive collection, of interlocutor types are shown, including a computer 804a, such as a personal computer or tablet computer, a smart cellular telephone 804b, a traditional telephone 804c, a chat server 805a, a web server 805b, an interactive voice response (IVR) system 805c, and an agent console 805d, which are interconnected via one or more wired or wireless telephone networks 801, data networks 803, and an internet 801. Two more or more of the interlocutor devices can carry on a dialog or conversation, which can be processed according to the forgoing descriptions. This analysis, as described, yields conversation data with metadata 102, which is created via supervised conversation analysis 807, automated conversation analysis 806, or a combination of both. The conversation classifier server 101b then communicates via appropriate data networks to access the conversation data 102 and perform the forgoing dominant path analysis.

The preceding example logical processes may include computer processing hardware to embody systems according to the '188 related invention; may be coupled with tangible, computer readable memory devices to realize computer program products according to the '188 related invention; and may be embodied as a machine logic method.

The '188 related invention may be realized for many different processors used in many different computing platforms, including but not limited to "Personal Computers" and web servers, running a popular operating systems such as Microsoft™ Windows™ or IBM™ AIX™, UNIX, LINUX, Google Android™, Apple iOS™, and others, to execute one or more application programs to accomplish the computerized methods described herein, thereby providing the improvement to the computer platform as set forth herein.

Dominant Path Analysis and Determination

At least one of the present inventors realized, as disclosed in the related and incorporated U.S. patent application Ser. No. 16/210,081, hereinafter referred to as the '081 related invention or '081 related patent application, that there was an unmet need in the art of computer-assisted business process analysis. Certain improvements we disclosed in the '081 related patent application improved the computer-based analysis tools through particular user interface enhancements and logical process improvements, while simultaneously improving the utilization of computer usage of computing resources such as memory footprint, processing bandwidth, and communications bandwidth to yield higher levels of simultaneously-served users by a single computing platform, thereby reducing the cost of the service to the operator.

At least one of the present inventors realized, as disclosed in the '081 related and incorporated patent application, that the number of projects that even the largest companies can complete in a year is limited due to the manually time intensive effort required, often across multiple departments. These engagements may involve tens of resources for several months whilst data is collected, analyzed, and reviewed by experienced practitioners. Hypothesis generated from executive interviews, observations, and computer generated reports often must be properly validated to achieve a reasonable degree of reliability in order for the business to decide to invest in the associated project and business plans. And, because the time-consuming nature of the data gathering, data preparing, and analysis, businesses struggle to respond in real-time to changes in customer desires and behaviors.

While businesses and organizations had adopted tools such as central customer database systems and financial forecasting tools to reduce the effort of such engagements, data sets often came and still come from non-integrated disparate sources, requiring additional database and programming efforts at the beginning of the engagement.

Further, even with integrated data sets, the process of conducting root cause analysis, validating assumptions, creating hypothesis or conversation models largely rely upon the practitioner(s) who have experience conducting such analysis and can quickly identify relevant problem/opportunity patterns. Lastly, by the time the results have been completed following months of analysis, business factors may have changed such that the results and assumptions are less relevant.

Based on these realizations, at least one of the present inventors has recognized that there is an unmet need in the art for improved and enhanced computer functions to detect, analyze, illustrate, and report customer behaviors while interacting with a business enterprise and the technology that represents the enterprise, to recommend responses to those behaviors to improve the outcomes experienced by the customer, and to measure the change in those behaviors and outcomes to verify or invalidate the modifications to the enterprise.

As disclosed in the '081 related invention patent application, the inventor devised an improved data processing system that continuously analyzes and automates a process of identifying statistically significant patterns of customer behavior linked to a specific set of customer outcomes and presenting these visually in a graph with linkages to the root causes, customer events, each step in the customer behavior, and the customer outcome. The improved computing system of the '081 related invention provides a set of hypotheses and recommendations based on the pattern matching solutions in a computer database and allows the user of the system to simulate the anticipated outcomes.

In the discussion of FIGS. 9-13, the blocks and arrows represent the relationships between the improved data processing systems and the customer behaviors and process flows that are relevant to identifying common customer behavior patterns that correlate to business and customer outcomes and relate to a given set of root causes, according to the methods and processes of the '081 related invention. The '081 related invention pertains to a method and system automating a process of identifying and analyzing the relationships between root causes that drive events that cause customer behaviors related to a business or customer outcome that is typically composed of one or more tasks. As such, various embodiments according to the '081 related and incorporated patent application are able to automatically and continuously, in real-time in some embodiments, analyze these relationships and to then make specific observations and recommendations based on an expert database, thereby reducing the time a cost of conducting this analysis manually.

Figure 9:
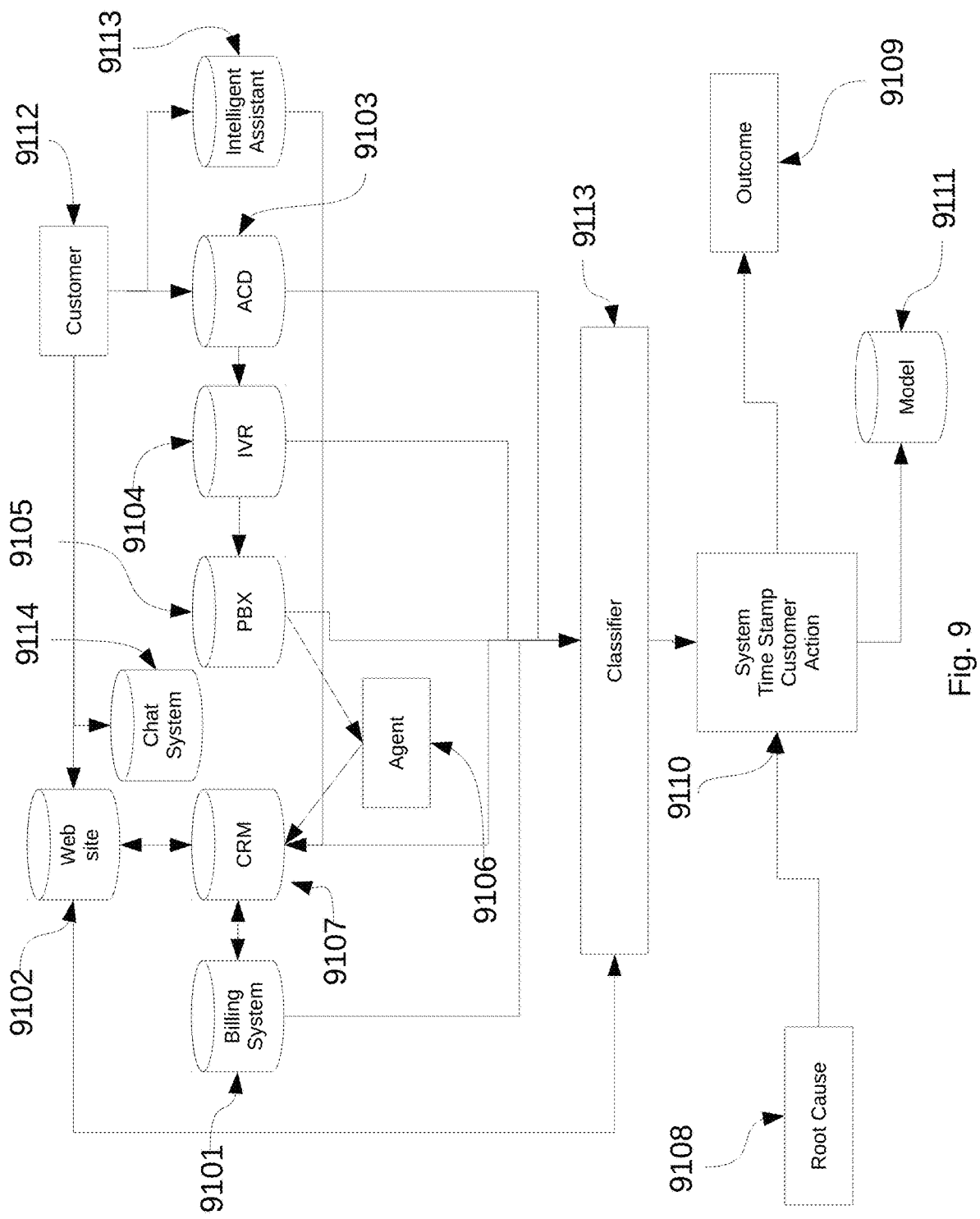
FIG. 9 illustrates an exemplary arrangement, according to the invention disclosed in the related and incorporated U.S. patent application Ser. No. 16/210,081, of computing components and elements to leverage disparate systems and data sources.

Referring now to FIG. 9, illustrates how an improved data processing system according to the '081 related and incorporated patent application leverages disparate systems that record customer events to identify customer behavior linkages between root causes and customer outcomes into predictive models. The exemplary arrangement of computing components, machine-performed logical processes, and communications networks in FIG. 9 include, but are not limited to, data processing systems that are often present within an organization, such as a billing system 9101 that stores information related to a customer's bill, a web site 9102 that customers 9112 can access to view information about a product or service, access their bill, and conduct customer self-service tasks, and a Customer Relationship Management (CRM) system 9107 that stores information regarding customer activity and interactions with the organization.

For customer interactions that involve speaking with an agent 9106, calls usually terminate into an Automatic Call Distributor (ACD) 9103 where the customer may be routed to an Interactive Voice Response (IVR) 9104 system so that the customer has the option for self-service, or directly to an available agent. Customers may also interact with the organization via an Intelligent Assistant 9113 such as Amazon Alexa™, Google Home™, or Facebook Messenger™ for self-service which accesses the customer's information in the CRM system 9107. In cases where the customer needs to speak directly to an agent, the call is routed to an agent whose phone is connected to a Private Branch eXchange (PBX) 9105 in a call center, who is able to facilitate the desired customer and/or business outcome to address the root cause.

Some notable key elements of the improved data processing system, according to the '081 related and incorporated patent application, include a classifier 9113, which provides raw data for a model 9111 to identify and correlate common customer paths to outcomes 9109 related to a root cause 9108. Given that the customer behaviors to be analyzed are stored across disparate data processing systems mentioned previously, a beneficial improvement to the computing technology provided by some embodiments of the '081 related invention is its ability to automatically identify and correlate customer behaviors from these disparate systems. This is done, in at least one embodiment, by automatically identifying similarities in the data sets and then inferring relationships. The primary elements of correlation may include a unique customer identifier, one or more session identifiers, and one or more event or record date/time stamps. These elements, along with the content of the data element, may allow the embodiment to create a digital representation or model of customer behavior paths over time.

Customer paths are aggregated, by the improved computing system, by one or more criteria including a unique customer identifier, classes of customers based on attributes such as customer type, lifetime value, total spend, outcomes, events, and root causes. The most common statistically significant paths are automatically compared, by the improved computing system, against one or more domain models 9111 which may be stored by the data processing system. The domain models are able to create observations and their associated recommendations to improve customer and business outcomes based on previous outcomes related to the same or similar customer paths. These domain models may be supplied by domain experts or created by the organization wishing to use the '081 related invention to improve customer outcomes. The models are automatically improved based on actual outcomes against the predicted outcomes generated by the system.

Figure 10:
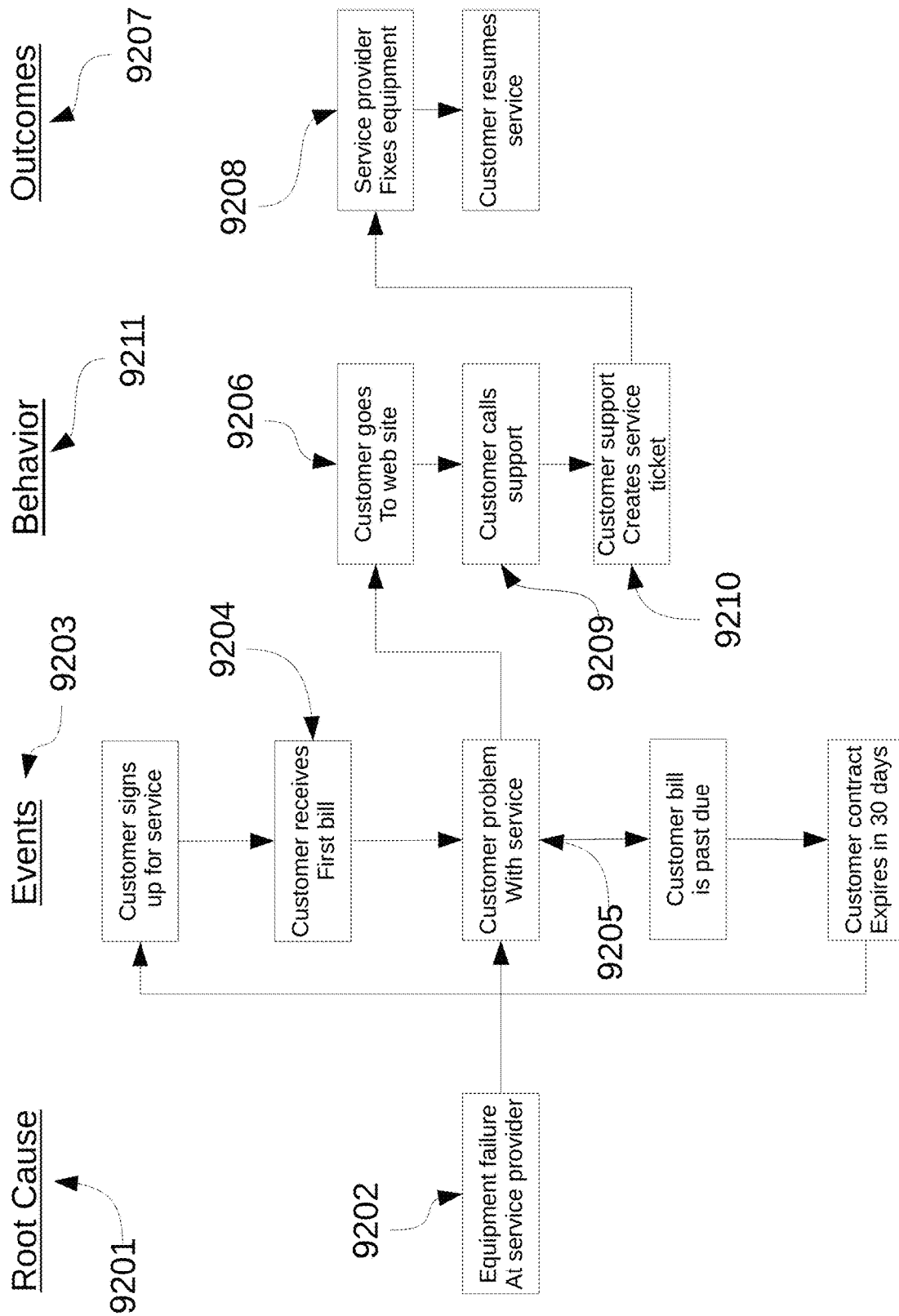
FIG. 10 shows, for reference, a hypothetical flow of user experiences interacting with the technology which represents a business entity's enterprise.

FIG. 10 shows a sample method or process according to the '081 related and incorporated patent application of how a root cause drives one or more events that result in customer behaviors that cause a customer outcome. This example process includes some or all of an identification of a root cause 9201, a computer record of a series of related events 9203, a plurality of examples of related customer or provider behaviors 9211, and their associated outcomes 9207. For example, given a root cause 9201 such as an equipment failure 9202 that causes an interruption of a customer's service 9205 which leads the customer to visit the service provider's web site 9206, then event records indicate that those customers with that problem subsequently call customer support 9209 who, most often, creates a service ticket 9210 in the service provider's system, which most often results in the service provider repairing the customer's equipment 9208.

Figure 11:
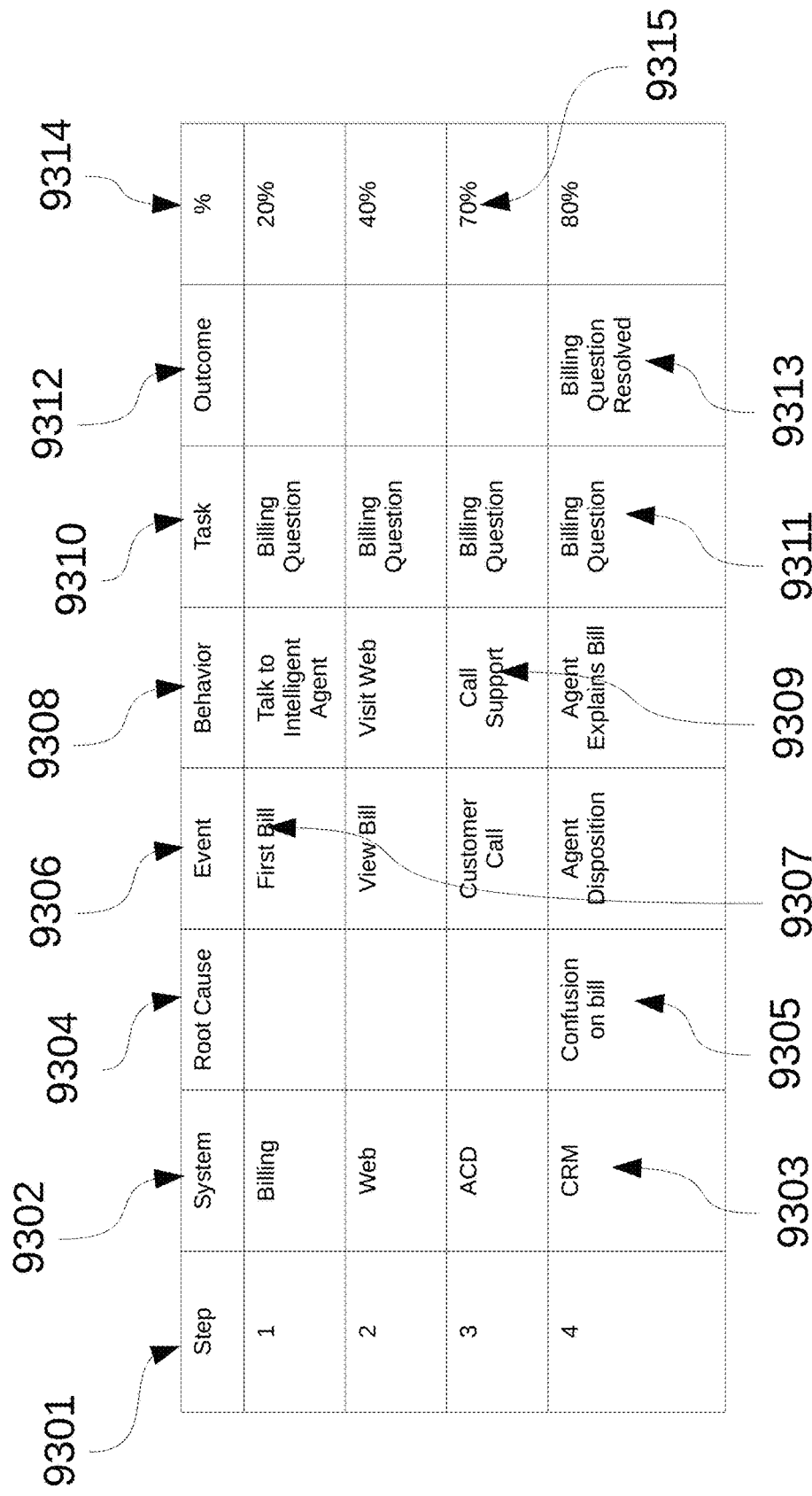
FIG. 11 presents an exemplary data structure embodiment for a classifer, according to the invention disclosed in the related and incorporated U.S. patent application Ser. No. 16/210,081, to collect and correlate disparate system events.

FIG. 11 provides details of an exemplary embodiment according to the '081 related invention for how the classifier of FIG. 9 collects, structures and correlates disparate system event records for customers over time and documents the customer behaviors and tasks associated with those events and behaviors and eventually correlates them to a customer outcome and root cause and measures the percentage of customers that were affected by that specific set of steps. This exemplary embodiment collects and analyzes customer behaviors 9308 from disparate systems 9302 such as CRM 9303 across multiple steps 9301 that may occur over the course of time to achieve a given outcome 9312 such as resolving a billing question 9313. If the digital model accurately predicts the root cause 9304 as described in the FIG. 1, such as a customer's confusion of their first bill 9305, in addition to tying the steps to the related task 9310 performed by the customer or the agent which occurs when the customer calls the organization 9309, such as answering the billing question 9311, then the automated system will be able to accurately predict what the dominant customer paths will be and their statistical significance 9314 given an event 9304 such as a customer receiving their first bill 9307. In this specific example, the automated and improved data processing system would be able to make the observation that a significant percentage, such as 80%, of customers had their billing question resolved 9315. Based on the system generated observation, an associated recommendation and associated estimated benefits would be made, which are further detailed in FIG. 13.

Figure 12:
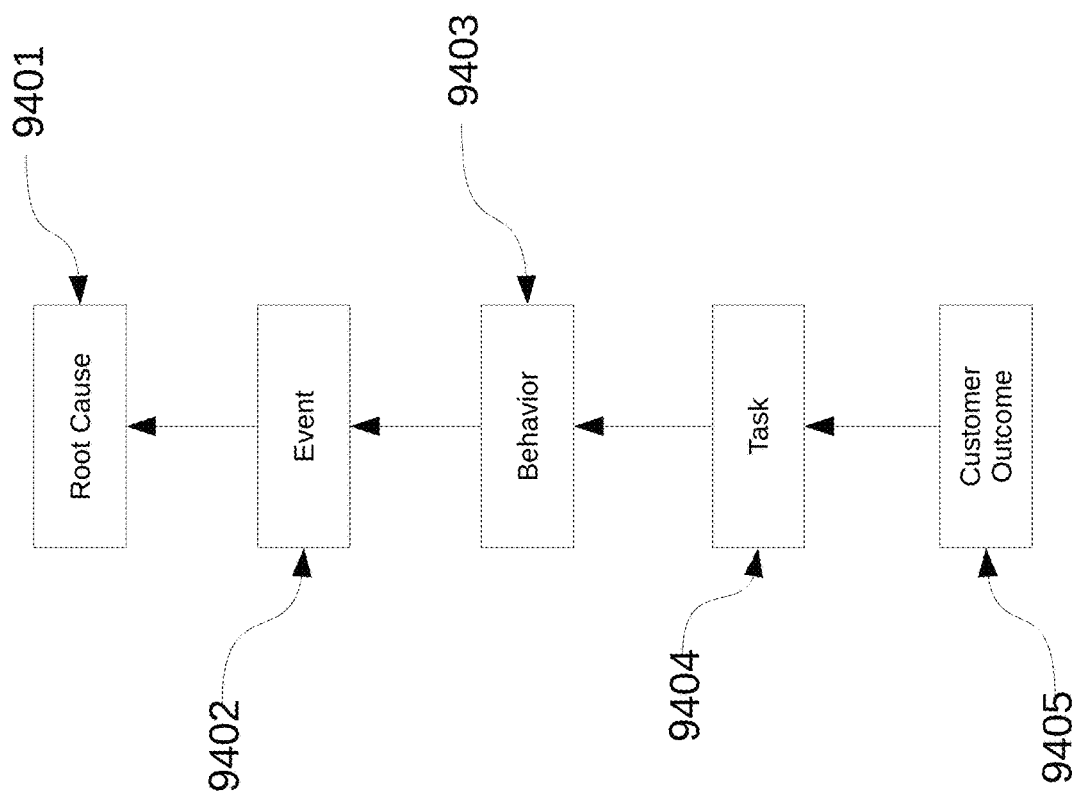
FIG. 12 illustrates an exemplary method, according to the invention disclosed in the related and incorporated U.S. patent application Ser. No. 16/210,081, for dominant path analysis.

FIG. 12 illustrates an exemplary embodiment according to the '081 related invention of a dominant path analysis process, which starts with a given customer outcome and analyzes customer interactions to identify the most common customer paths that occur to achieve a given outcome given an event and root cause. FIG. 12 further illustrates a path analysis process which at least one embodiment of the '081 related invention automatically performs. It begins with a given customer or business outcome 9405 and analyzes the data from the systems previously mentioned in FIG. 9 to identify all tasks 9404 that were performed by the agent, the Intelligent Agent, or the IVR on behalf of the customer to achieve the outcome. Each step taken to perform the task and the associated customer behaviors 9403, examples of which are contained in FIG. 10 and FIG. 11, are further identified and counted such that a tree containing the most statistically significant customer behaviors can be accurately traced to the given outcome. The improved data processing system then attempts to identify the event(s) 9402 and associated root cause(s) 9401 through direct correlations or probabilistic deduction based on previous instances of the same or similar event 9402 and the associated root cause 9401 analysis.

Figure 13:
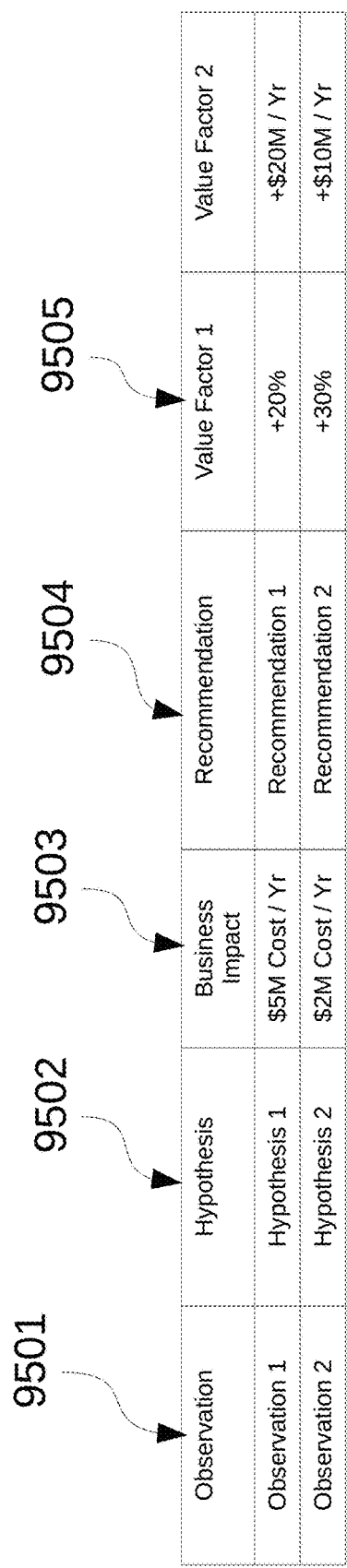
FIG. 13 sets forth an exemplary results report, according to the invention disclosed in the related and incorporated U.S. patent application Ser. No. 16/210,081, including observations, hypothesis, recommendations, and their estimated impacts resulting from exemplary methods of analysis relative to the examples shown in FIGS. 11 and 12.

FIG. 13 shows an exemplary embodiment of the results of at least one embodiment of the '081 related invention which are communicated to a user or another computer process, including the improved data processing system's observations, hypothesis, recommendations, and their estimated impacts resulting from the analysis in FIG. 11 and FIG. 12. This sample output of the recommendation 9504 and benefits model 9505 that matches the hypothesis 9502 are based on the observations 9501 made by the system based on the pattern analysis depicted in FIG. 11 and FIG. 4 as described previously. The associated business impact 9503 of the hypothesis is based upon the statistical significance of the observation as contained in FIG. 11. The output contained in FIG. 13 is comprised of data based upon domain experts that input sample outputs for a given domain based on their experience and the expected performance of the recommendations.

Training of Chatbots from a Corpus of Human-to-Human Chats

Having established a baseline functionality and terminology in the foregoing paragraphs, we now turn our attention to the disclosure of inventive processes and systems of a related for training a AI-based chatbot using a corpus of text-recorded human-to-human chats or conversations. For reference and for illustration of at least one example embodiment according to the present and related invention, the disclosure and drawings from the related invention are included herewith.

Figure 14:
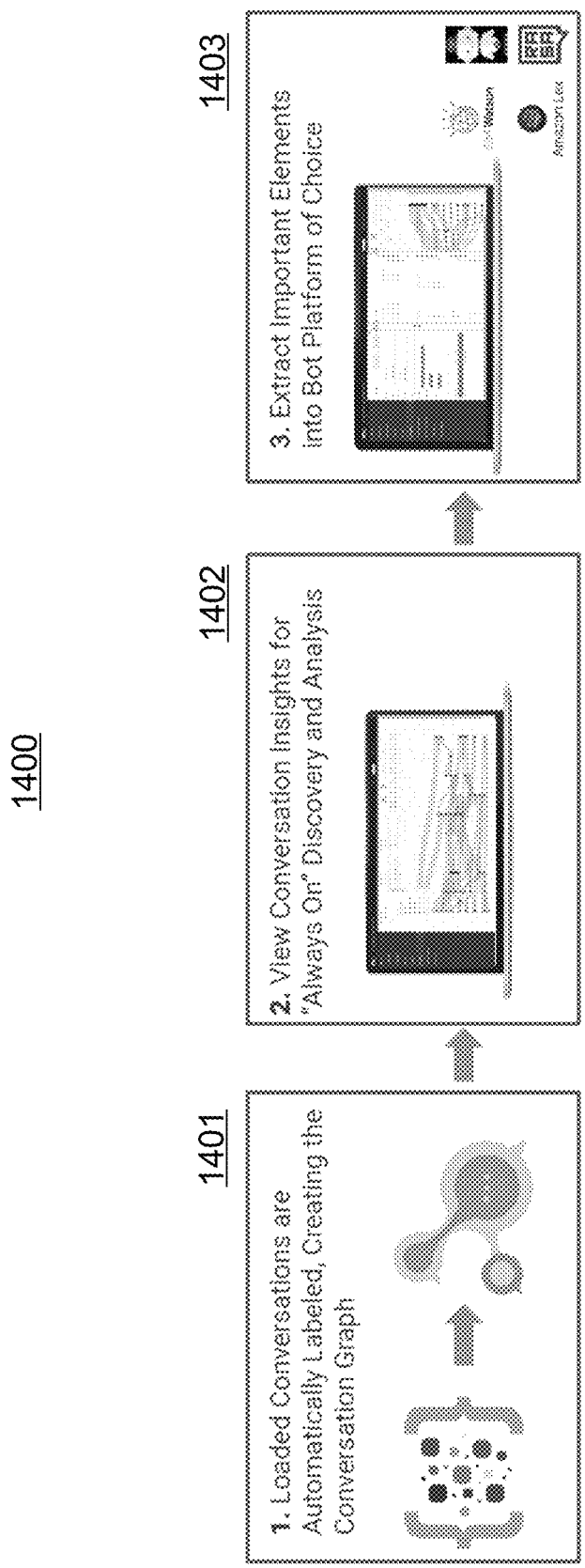
FIG. 14 illustrates a high-level process according to a related invention.

FIG. 14 illustrates a high-level process 1400 according to a related invention in which:

(a) 1401 conversations are loaded from a corpus of real conversations, automatically labeled using a process such as that described in the foregoing paragraphs (or a suitable alternative), and a conversation graph is automatically created using a process such as that described in the foregoing paragraphs (or a suitable alternative);

(b) 1402 a display of conversation paths which meet a user-selectable minimum path dominance is produced and shown to one or more human supervisors, such as a Sankey-type of display, using a process such as that described in the foregoing paragraphs (or a suitable alternative), to enable insight discovery by the human supervisor user; and (c) 1403 under user command and selection, specific elements from the displayed conversation representation are extracted and exported to one or more third-party chatbot platforms such as, but not limited to, the IBM Watson™, Amazon Lex™, and/or Rasa open-source natural language processing chatbot platform, to accomplish the initial training of the AI model for the chatbot platform.

Figure 15:
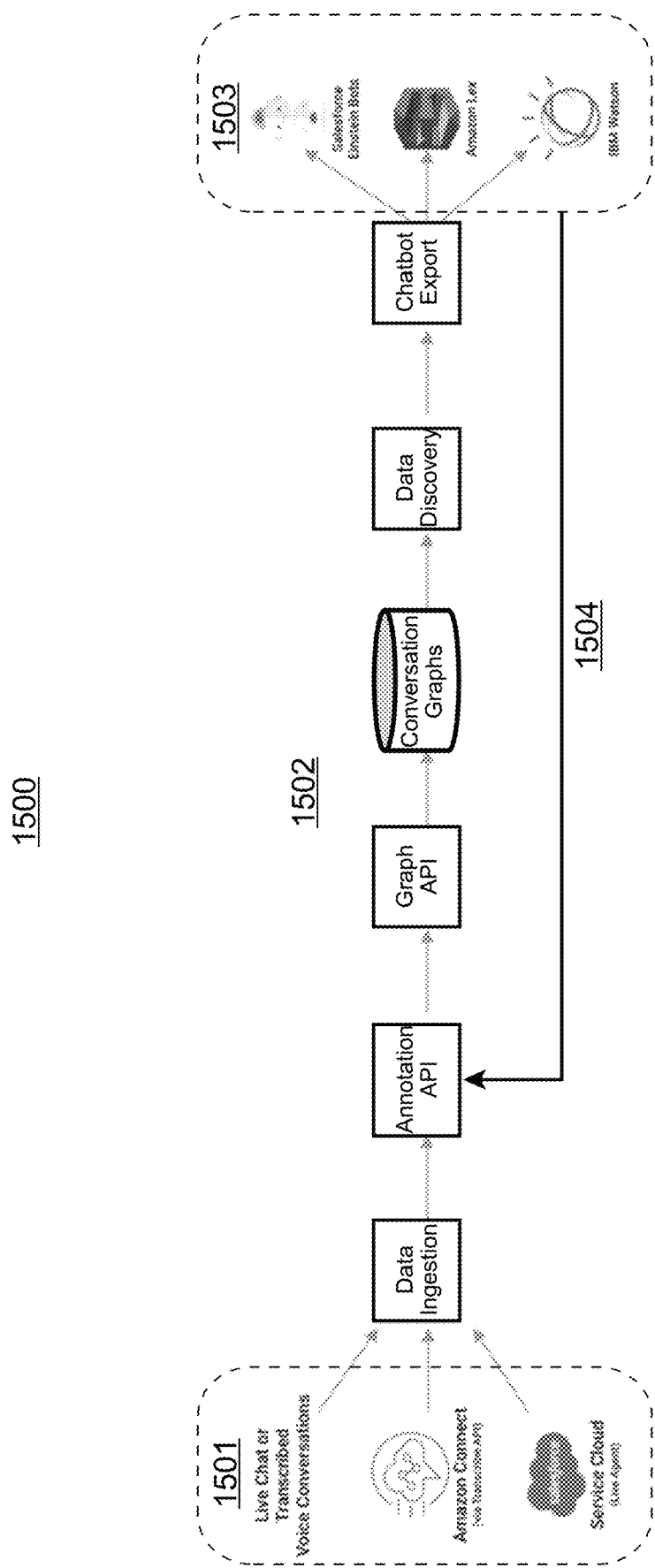
FIG. 15 illustrates an example production pipeline according to a related invention.

Turning to FIG. 15, more details of processes and systems according to a related invention are illustrated for one example embodiment 1500 of a production pipeline for the conservation data flow. Text-based conversation data 1501, such as, but not limited to, transcribed voice conversations, text-recorded text chats, or other sources of text-based conversation data, is received and ingested into the production pipeline 1502. The conversations are annotated and graphs are generated, using a process such as that described in the foregoing paragraphs (or a suitable alternative), and the graphs are collected into one or more databases. Data discovery is performed in order to train the initial AI models, which are then exported into one or more chatbot platform formats 1503. Optimization 1504 is performed using supplemental conversation data collected during use of the AI-based chatbot, wherein the supplemental conversation data is received into the production pipleline 1502 through ingestion or directly into the annotation (labeling) stage.

Figure 16A:
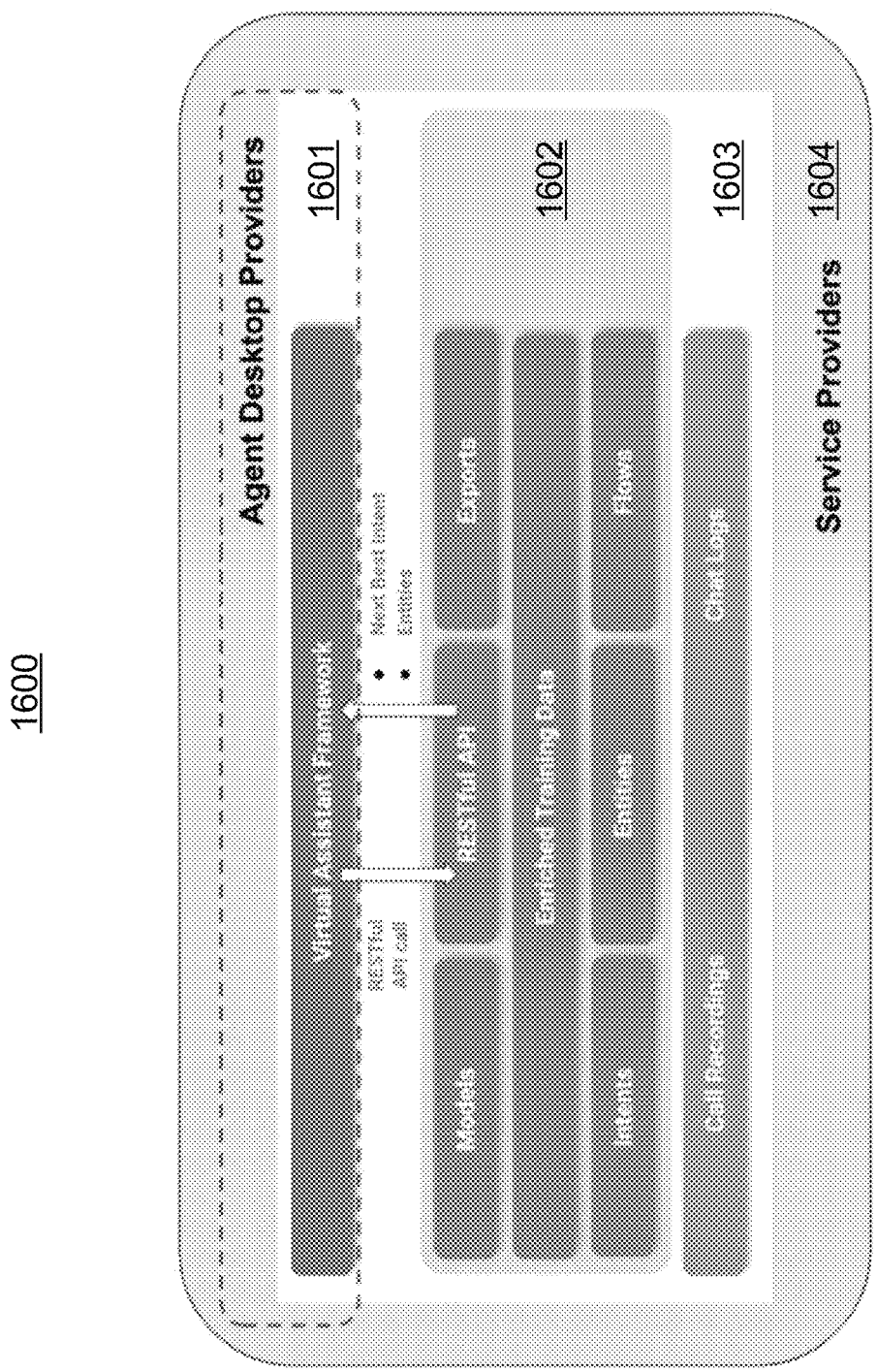
FIGS. 16A and 16B depict example arrangements of systems, components and interfaces for cognition engines according to a related invention.
Figure 16B:
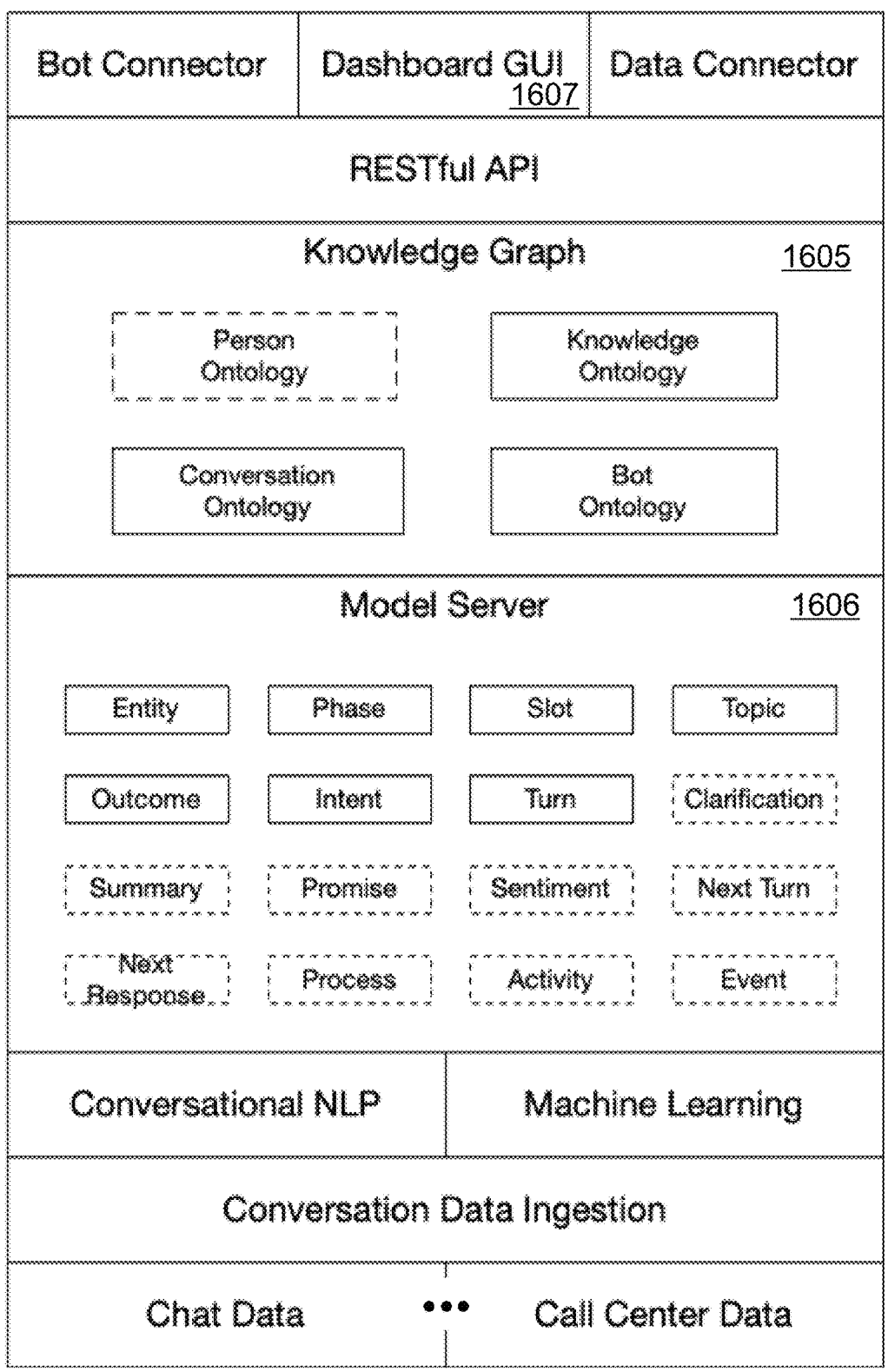

Referring now to FIG. 16A, at least one possible arrangement 1600 of systems and components is illustrated for at least one example embodiment in which a cognition engine 1602 utilizes one or more computer-performed processes and computer systems according to a related invention interfaces to one or more virtual assistant frameworks and agent desktop providers 1601, such as, but not limited to, Salesforce Einstein™, IBM Watson™, Google Dialog Flow™, Kore.ai, Salesforce Service Cloud™, Amazon Connect™ and Genesys™, via RESTful API calls and responses including a projected next-best intent and one or more entities. Data providers, such as, but not limited to, Nice™ and [Verint], may provide call recordings and/or chat logs 1603 to be ingested into the corpus for annotation and further processing as described in the paragraphs herein. Service providers 1604, such as, but not limited to, Accenture, Verizon, and Teleperformance may integrate these plurality of platforms and services. FIG. 16B illustrates a similar arrangement 1600' with additional detail for possible architectural components for the knowledge graphing 1605 and the conversational model server 1606. As shown in this example embodiment, the training pattern for output to an AI-based automated conversation agent may include, but are not limited to, some or all of sample prompts, entities, flows, intents, utterances, outcomes, speech acts, turn groupings, topics, phases, sentiment, clarifying questions or statements, conversation summaries, promises, next best turn, next best action, agent activities, business processes, and events.

As such, in at least one embodiment according to a related invention, text-based conversation data representing a plurality of conversations is ingested into a production pipeline for building a set of coefficients to seed a machine-learning process for one or more AI-based chatbots by annotating the text-based conversation data according to one or more criteria selected from intents, topics, turns, and outcomes. A dominant path modeler, such as, but not limited to, the dominant path modeler disclosed in FIG. 4, determines a plurality of dominant path weights for conversation paths between nodes of turns. A weighted conversation modeler then, using the dominant path weights, creates one or more weighted conversation models, such as, but not limited to, the weighted conversation model illustrated in FIG. 6, using the processes such as, but not limited to, those disclosed in the foregoing paragraphs and in the related and incorporated patent applications. For example, presuming as input a dominant path model data structure in which each dominant path weight (402, 404, 406, and 408) between steps in the paths represent the sums $W_1$-$W_N$ of traversals between steps in the dominant path for each conversation represented in the ingested text-based conversation data, a weighted conversation model is created from each path segment $P_1$-$P_N$ between turns $T_1$-$T_N$ from each dominant path model and the associated weights $W_1$-$W_N$ by converting, such as by normalizing, each dominant path weight in the conversation model 600 such that the percentage of conversation traversals are represented as a percentage of the total traversals from the plurality of processed conversations. The weighted conversation model 600 now contains the normalized likelihoods that future conversations having similar or matching combinations and sub-combinations of intents, topics and outcomes will traverse each available conversation path. Whereas these normalized likelihoods are predictive of future behaviors, they can then be used as seed values for machine-learning coefficients in an AI-based process, such as an AI-based chatbot. Specific available chatbot platforms each require particular machine-learning seed value input data structures, which can be readily generated by a chatbot exporter as shown in FIG. 15.

Further, using text-based conversation records accumulated during subsequent user interactions with the chatbot, such as changes in dominant paths among previously-known intents, topics and outcomes, as well as additions of new intents, topics and outcomes, the machine-learning models and their operating coefficients may be periodically or continuously updated by ingesting the additional text-based conversation data into the production pipeline 1500, performing the forgoing processes on the augmented or supplemented corpus of conversation data, and exporting new (or revised) machine-learning coefficients to one or more AI-based chatbot platforms 1503.

As stated in the foregoing paragraphs, the generated training data can be equally well be exported to and imported by AI-based automated conversational agent system other than chatbots, such as, but not limited to, interactive voice response (IVR) systems, voicebot, prompts, entities, slots and flows. Those ordinarily skilled in the art will recognize that the invention is not interfacing to chatbots, that other embodiments can equally well be used to train other AI-based automated conversation agent systems.

Interactive Conversational Corpus Exploration User Interface

As previously discussed with particular regard to the example high-level process shown in FIG. 14, after conversations have been loaded from a corpus of real conversations, automatically labeled using a process such as that described in the foregoing paragraphs (or a suitable alternative), and a conversation graph has been automatically created using a process such as that described in the foregoing paragraphs (or a suitable alternative), the present inventors have developed a unique user interface (UI) 1402 and method of interacting with a user via the UI which a displays conversation paths that meet user-selectable minimum path dominance to one or more human supervisors via a computer human interface device, such as displaying a Sankey-type of graph, to enable insight discovery by the human supervisor user of which conversational paths to model and represent in training data for an AI-based automated agent system. Such a user interface, while particularly useful to the systems and methods of the related inventions disclosed herein, is not limited to such utility, and can well be used to explore corpora of digitally recorded two-interlocutor conversations separate and apart from AI-based automated agent systems, as those skilled in the relevant arts will readily recognize. Similarly, embodiments of a UI according to the present invention may also be realized with respect to and interoperability with other automated agent systems, not just those of the example embodiments disclosed herein.

In general, according to the present invention, at least embodiment includes improving a Dashboard GUI generator 1607, as referenced in FIG. 16B, to perform certain computer functions to present a flow-oriented graphical depiction through which, under user command and selection, specific elements from the displayed conversation representation are explored in user-selectable levels of detail. This exploration utility provided by the improved UI enables a user of some embodiments to then control which conversational paths contained within the corpus, but not all paths, will be subsequently extracted and exported to one or more AI-based automated agent systems and platforms, as previously discussed.

Figure 17:
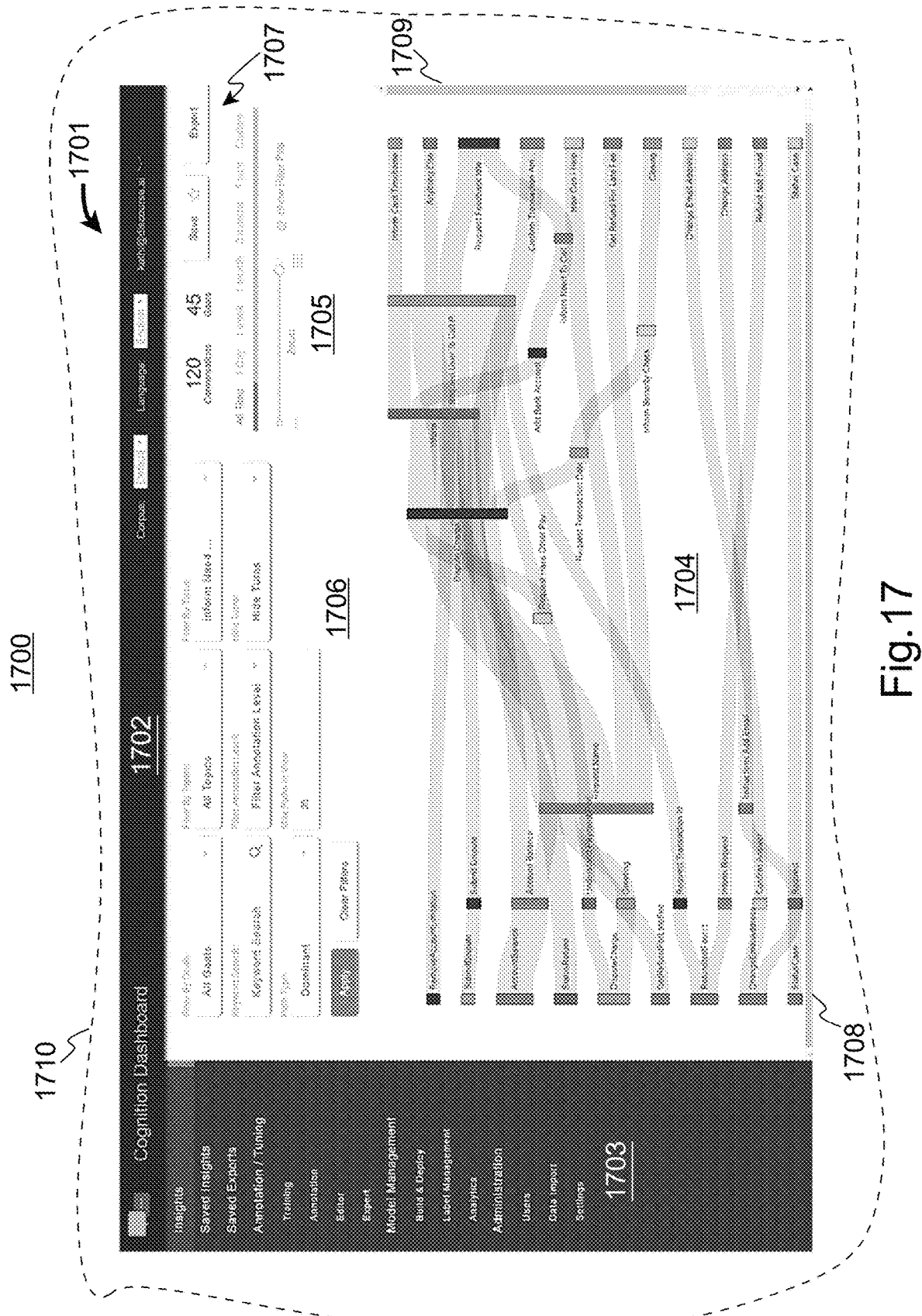
FIG. 17 depicts an example User Interface (UI) which is automatically prepared, rendered and displayed by a computer system using one or more processes according to the present invention, including an interactive flow-diagram.

Referring now to FIG. 17, an example UI 1701 is shown 1700 as prepared, rendered and displayed, such as by overlaying onto the existing UI, by the system on a portion 1710 of a computer human interface device, such as on a computer screen, printout, transmitted image, projected image, etc. This particular example embodiment 1701 includes a banner area 1702 across the top, in which a digital corpus, a natural language, and a set of user preference can be selected by a user. On the left margin 1703 of this particular example embodiment one or more top-level actions can be selected by the user, such as by moving a pointer using a mouse, trackball, touchscreen, etc., and selecting an action, such as by tapping, clicking, or touching. In a portion 1704 of this particular example embodiment is shown a flow-oriented graph, such as an interactive Sankey-style diagram, which has been automatically been prepared, rendered and displayed, such as by overlaying onto the existing UI, by the system according to this example embodiment of the invention under initial filter settings and initial constraints.

In another portion 1705 of this particular example embodiment, the user is provided by the system's preparation, rendering and displaying, such as by overlaying onto the existing UI, one or more indicators of the initial (default) constraints and, in another portion 1706, the user is provided one or more indicators of the initial (default) filter settings which were used in the creation of the currently-displayed flow-graph 1704. These filter criteria 1705, 1706 are preferably interactive so that the user can selectably change them, thereby triggering updates to the flow-graph 1704, to explore underlying lower-level details and to gain higher-level insights of the data within the selected corpus. Whereas a typical corpus containing hundreds or thousands of conversations may result in a considerably large and detailed flow-graph, panning 1708 and scrolling 1709 controls may also be provided on the UI.

Figure 18:
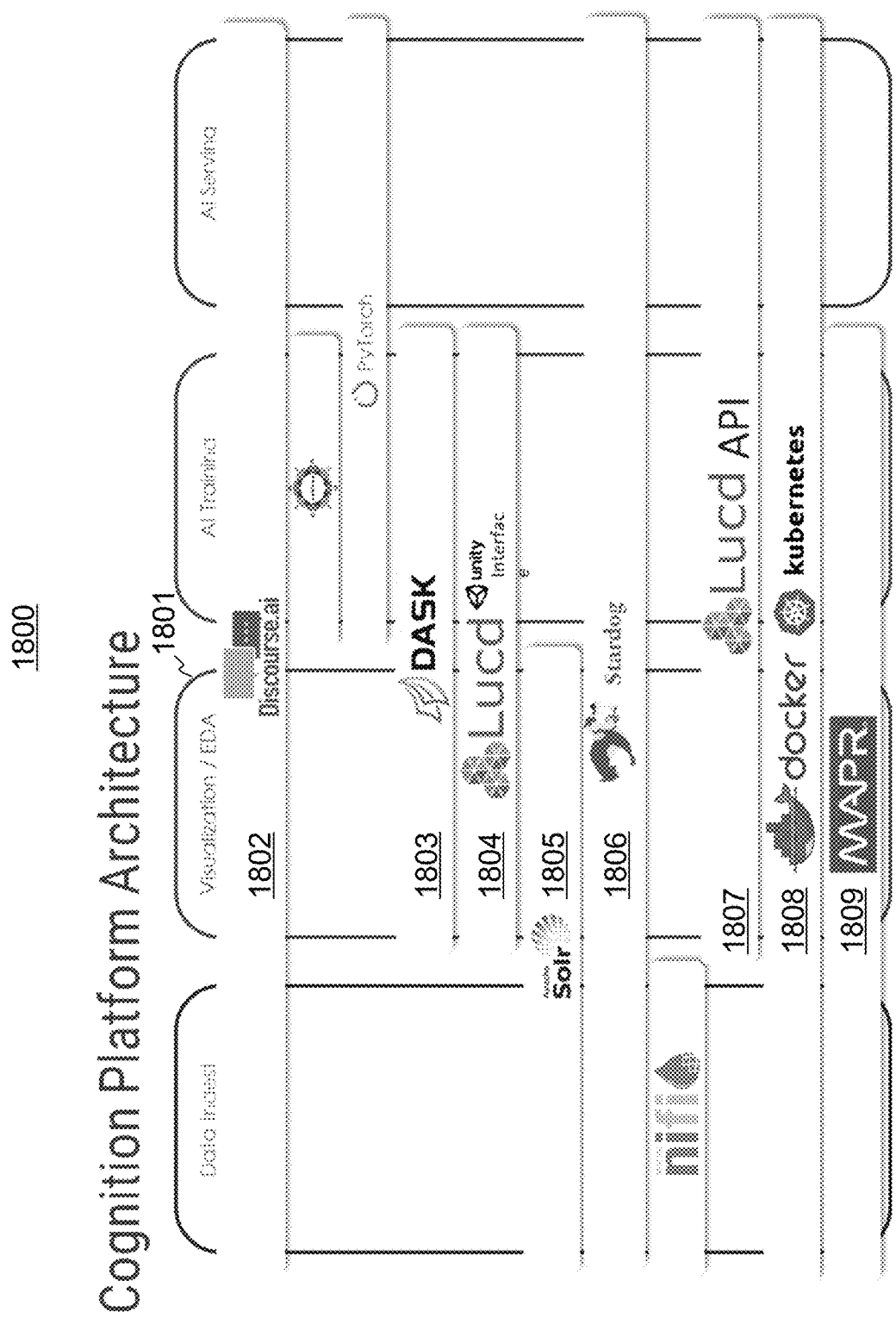
FIG. 18 sets forth an example architecture of a cognition platform, including in particular a Visualization and Exploratory Data Analysis (EDA) subsystem.

Referring now to FIG. 18, one example cognition platform architecture 1800 for realizing such an embodiment 1802 of the present invention includes a Visualization and Exploratory Data Analysis (EDA) 1801 component which access and uses available functions through Application Programming Interfaces (APIs), libraries, remote function calls, and/or software-as-a-service from:
(a) a flexible analytics library 1803 for scalable parallel computing, such as DASK in Python, available from NumFOCUS™;
(b) an interactive AI modeling interface for an enterprise AI platform 1804, such as the Lucd Unity™ Interface for the Lucd™ Enterprise AI Platform from Deep Insight Solutions, Inc.;
(c) an enterprise-searching 1805, such as the open-source Apach Solr™ search platform from the Apache Lucene project;
(d) data unification 1806, such as the Stardog™ data unification platform using knowledge graph from Stardog Union Inc.;
(e) a API-accessible AI-based services platform 1807, such as the API to the previously-mentioned Lucd™ AI platform;
(f) services to build, distribute and run containers 1808, such as Docker Swarm™ and Kubernetes™; and
(g) services for optimizing storage, management, processing and analysis of data for AI and analytics applications 1809, especially for distributed data in the cloud, such as those available from MapR™.

In other embodiments, other available services, APIs, platforms, etc., may be accessed, coopted, engaged, integrated, or otherwise employed to achieve the functionality of the present invention.

Figure 19:
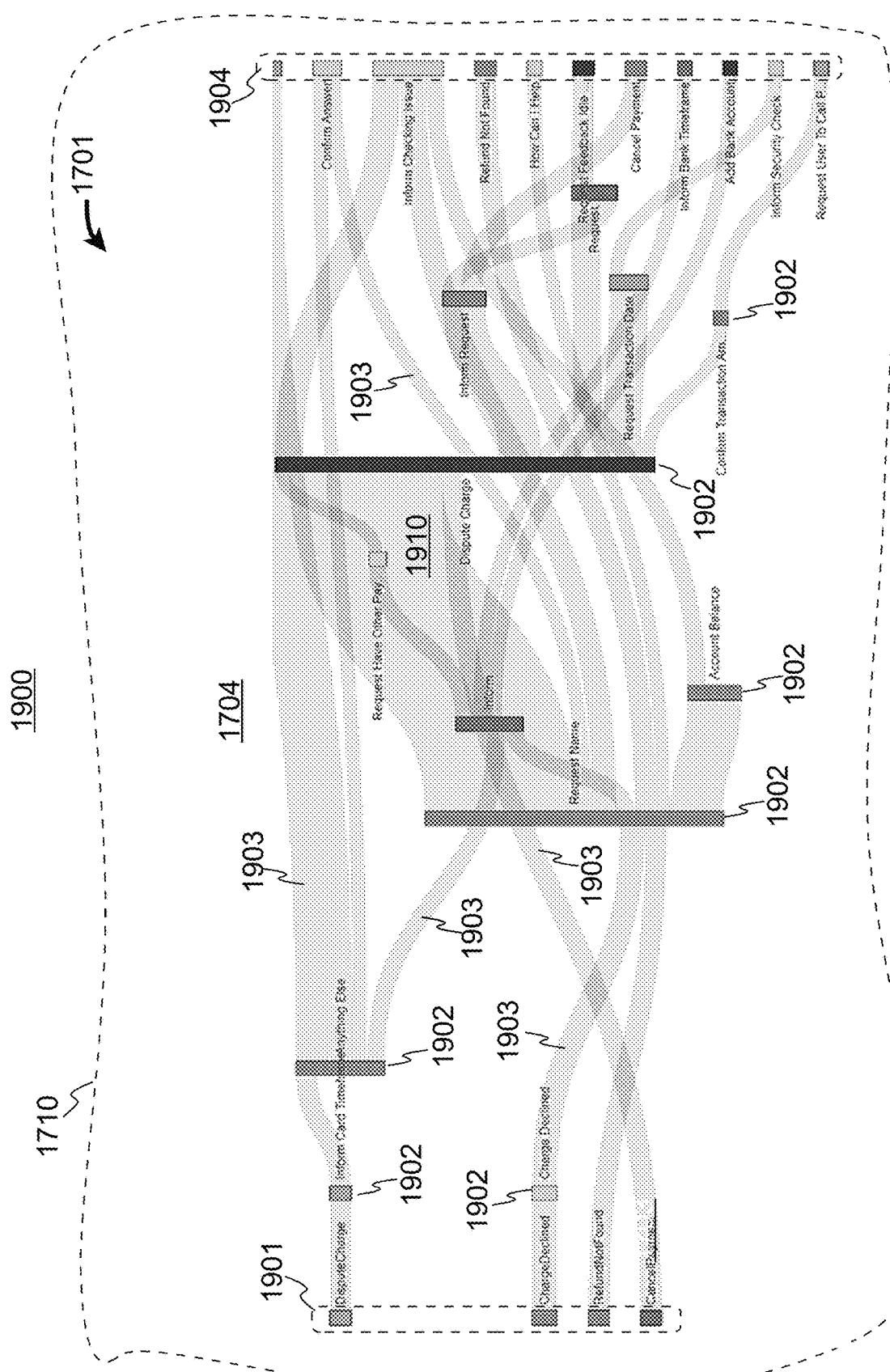
FIG. 19 provides a depiction in greater detail of the example flow-graph as illustrated in FIG. 17.

Further, according to this example embodiment, the system prepares, renders and displays, such as by overlaying onto the existing UI, a Conversation Insights Flow-Graph 1704, an example of which is shown 1900 in greater detail in FIG. 19, which is, preferably, a Sankey-type flow-graph visualization of the aggregate of conversations which meet a specified set of filters criteria, and their associated flows. The user-interactive flow-graph is loosely showing information from the source (the conversation Goals, in this example case) on the left of the flow-graph, to the end of the conversation, on the right, as such:

Customer Goals are shown as the source of the flow (with conversation Goals depicted on the left 1901);

The width of each conversation pipe 1903 (depicted in this example as grey bands) flowing rightward from the conversation Goals on the left represent proportional volumes of conversations for each goal;

The vertical bars 1902 (depicted in this example as colored bars) to the right of the Goals represent the "Turns" in the represented and aggregated conversations, recalling from earlier paragraphs that Turns are a back-and-forth conversational transitions between two interlocutors;

The wider flows show the statistically and relatively more dominant paths in the conversations in the selected corpus, depending, preferably, on Zoom and Max Paths user display settings;

A user may interactively select (e.g., click, tap, touch, etc.) on a depicted Turn Purpose bar to see conversations containing these Turns; and A user may select (e.g., click, tap, touch, etc.), hold and drag the Turn Purpose bar to get a better view of the conversation flows.

Figure 20:
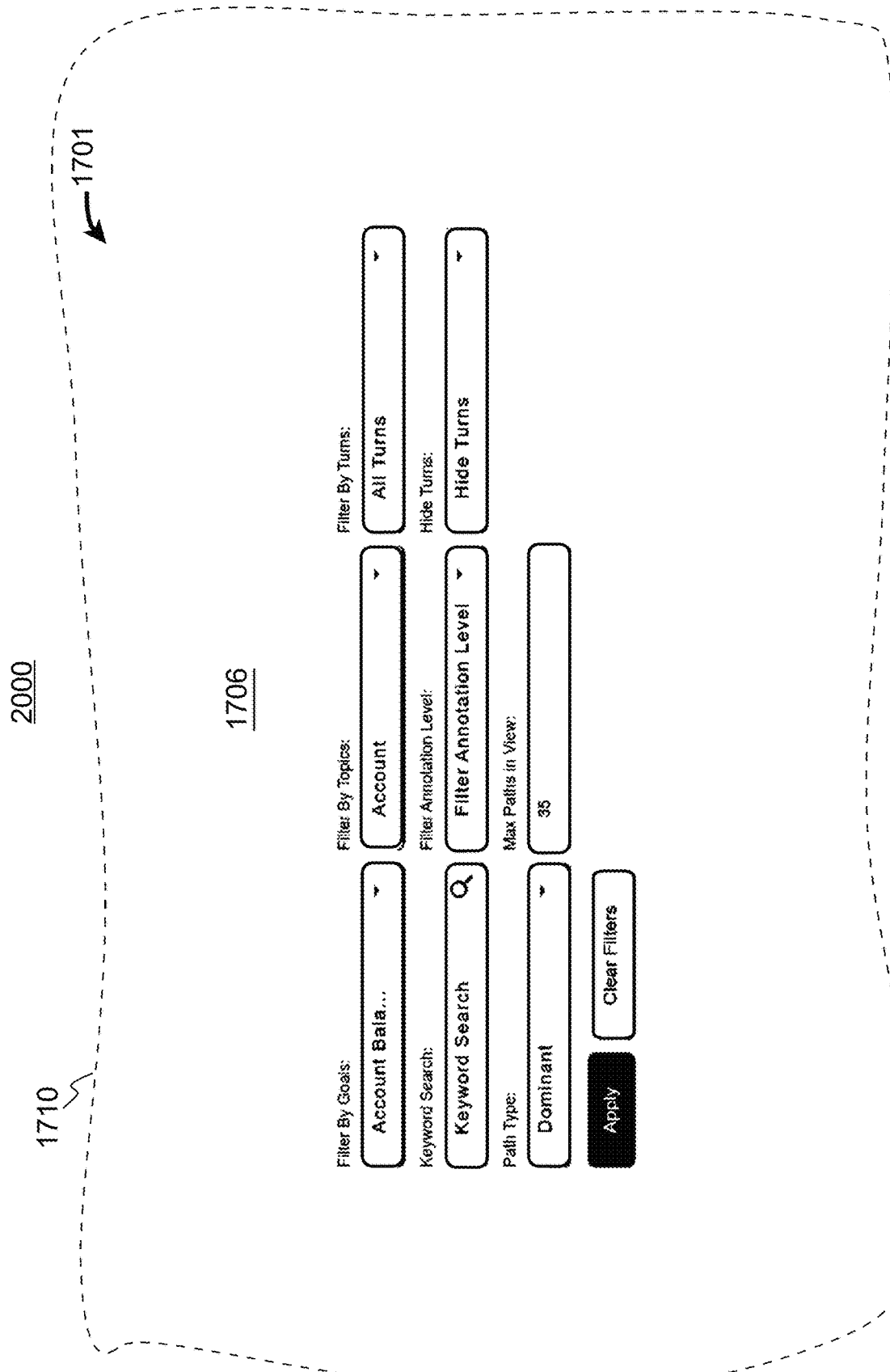
FIG. 20 depicts an example User Interface (UI) which is automatically prepared, rendered and displayed by a computer system using one or more processes according to the present invention, including a set of user-adjustable filter criteria for causing the computer to revise and update the flow-graph of FIG. 17.

Some example features of at least one embodiment according to the present invention, the system prepares, renders and displays, such as by overlaying onto the existing UI, a Conversations Insights Filters portion 1706 of the UI 1701 as shown 2000 in FIG. 20. For each of the "Filter By" features (Filter By Goals, Filter By Topics, Filter By Turns, Filter By Annotation Level), the user can move the cursor or pointer into the desired selection box, and optionally select (e.g., click, tap, touch, etc., or just hover over in some embodiments), and the system will produce on the UI a drop-down list. The user may make a selection (or selections), and select the "Apply" button to have the filter applied to the view. Responsive to the activation of the Apply button, the system re-runs the searching and filtering processes on the corpus, re-runs the flow-graph generating processes using the results of the searching and filtering processes, and updates the flow-graph depiction 1704 on the UI.

According to at least one example embodiment of the present invention, user selections received from a drop-down dialog are considered by the system using a logical OR function. For example, conversations which are filtered for three Goals will include at least one or more of those goals. In other embodiments, this logical function may be more customizable, such as by providing the user more logical operators to use in the filtering, such as AND, Exclusive OR (XOR), and NOT. As the user makes selections across multiple "Filter By" options, the user is interactively requesting for the system to search, sort and filter the conversations in the corpus to update the flow-graph to show only Topics, Goals and flows which meet the revised "Filter By" criteria. Additional "Filter By", as shown in this example embodiment of the UI, may include:

Keyword Search: Search for conversations based on keyword or semantic search of the Graph;

Hide Turns: Exclude Turns in combination with any other filters, to provide a more focused view of the conversation flow;

Path Type: "Dominant", presents your highest frequency conversation sets based on the user's selected filters, and "Outlier" shows the "long tail"; and Max Paths in View: Can be modified to a higher/lower number of paths to be displayed in the diagram.

Figure 21:
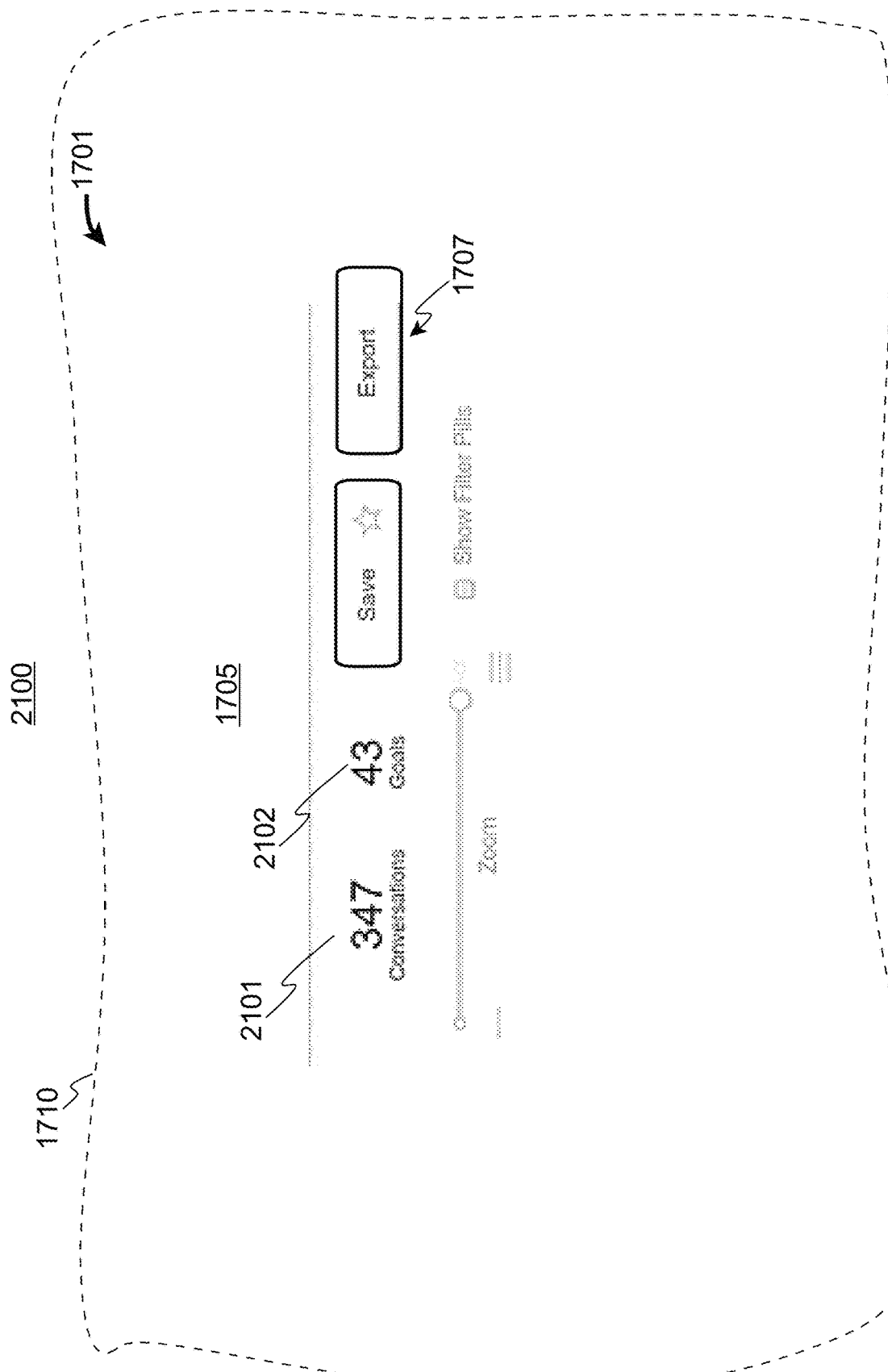
FIG. 21 depicts an example User Interface (UI) which is automatically prepared, rendered and displayed by a computer system using one or more processes according to the present invention, including a set of user-adjustable constraints for causing the computer to revise and update the flow-graph of FIG. 17.
Figure 22:
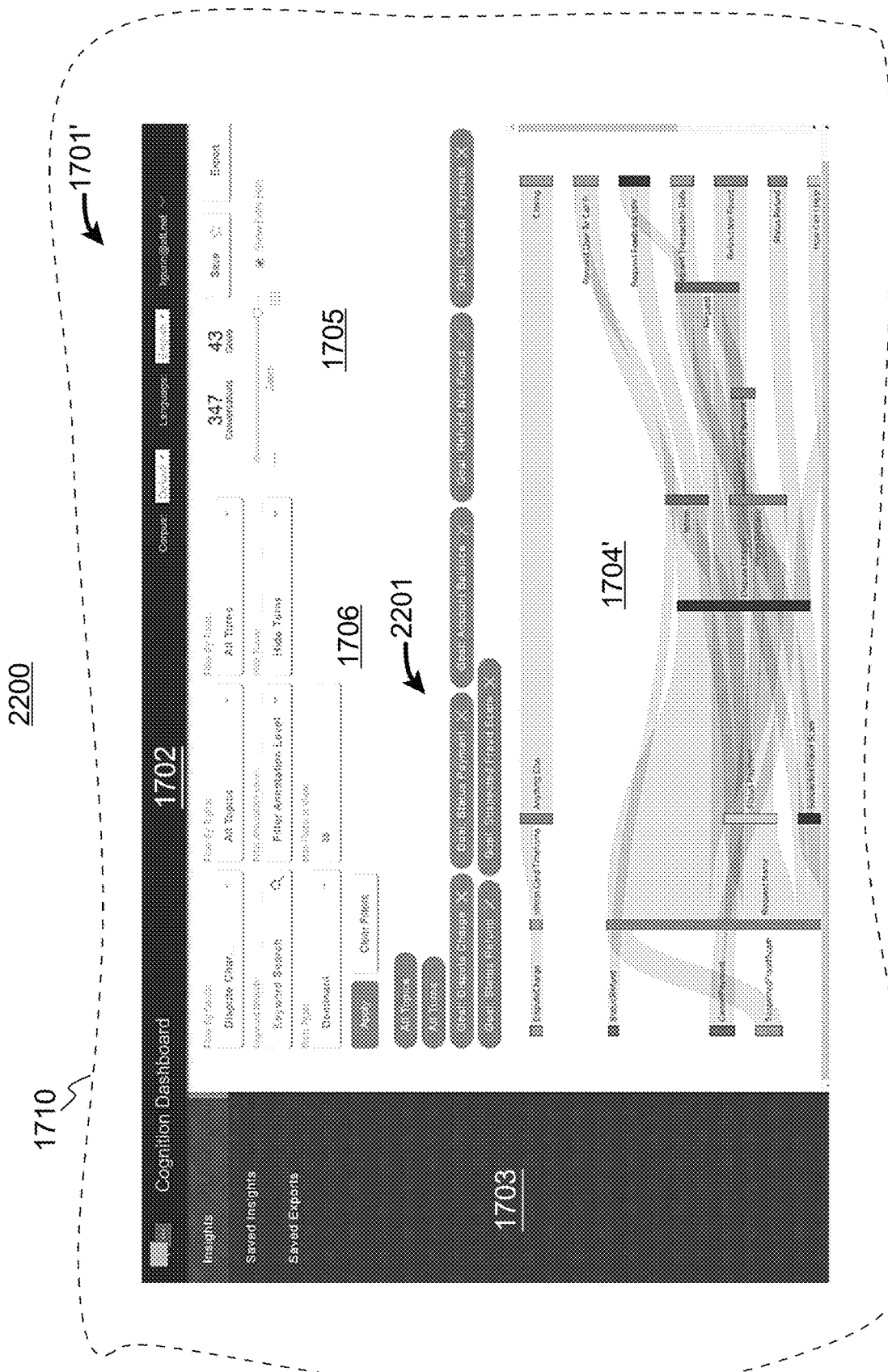
FIG. 22 depicts an example User Interface (UI) which has been automatically updated by a computer system using one or more processes according to the present invention, from the depiction of FIG. 17 following user-adjustment of one or more of the filters and constraints.

Referring now to FIG. 21, the system also, preferably, prepares, renders and displays, such as by overlaying onto the existing UI, an example constraints portion 1705 is shown 2100 for a UI, including an indication of the current number of conversations and Goal which meet the Filter By conditions and are represented in the currently-rendered flow-graph, a Zoom level control for scaling up or down the actual depiction of the flow-graph, an option, such as a button, to save the current filter criteria (preserves the filters set, creating a "Saved Insights" for future/shared view), an option to show "Filter Pills" (highlights the filter criteria for easy visibility) and an option to Export the filters set (preserves the filters set, creating a "Saved Export" (in format chosen) for future use). FIG. 22 provides a depiction of the updated UI 1701' with the revised flow-graph 1704', as re-generated by the system the applied example filter criteria changes of FIGS. 21 and 22, including the Filter Pills 2201 which indicate all of the currently filtered-on Goals, Turns, and Topics. As shown, each of these Filter Pills can be further selected by the user, responsive to which the system will update the filter results and the flow-graph accordingly.

User Interface Drill-Down Functions

Figure 23:
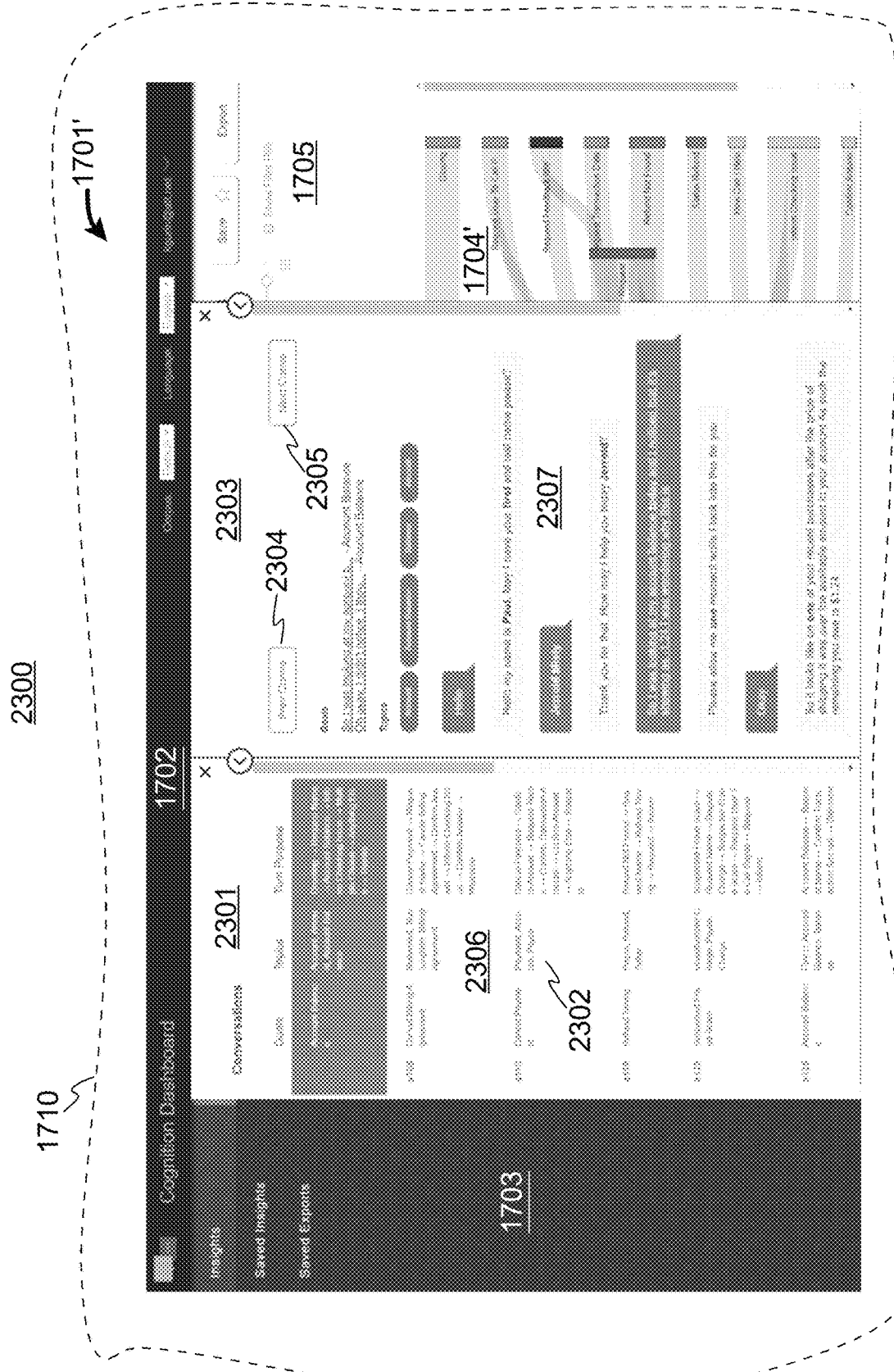
FIG. 23 depicts an example User Interface (UI) which is automatically prepared, rendered and displayed by a computer system using one or more processes according to the present invention, including one or more drill-down dialogs such as the illustrated set of conversation detail drawers.
Figure 24:
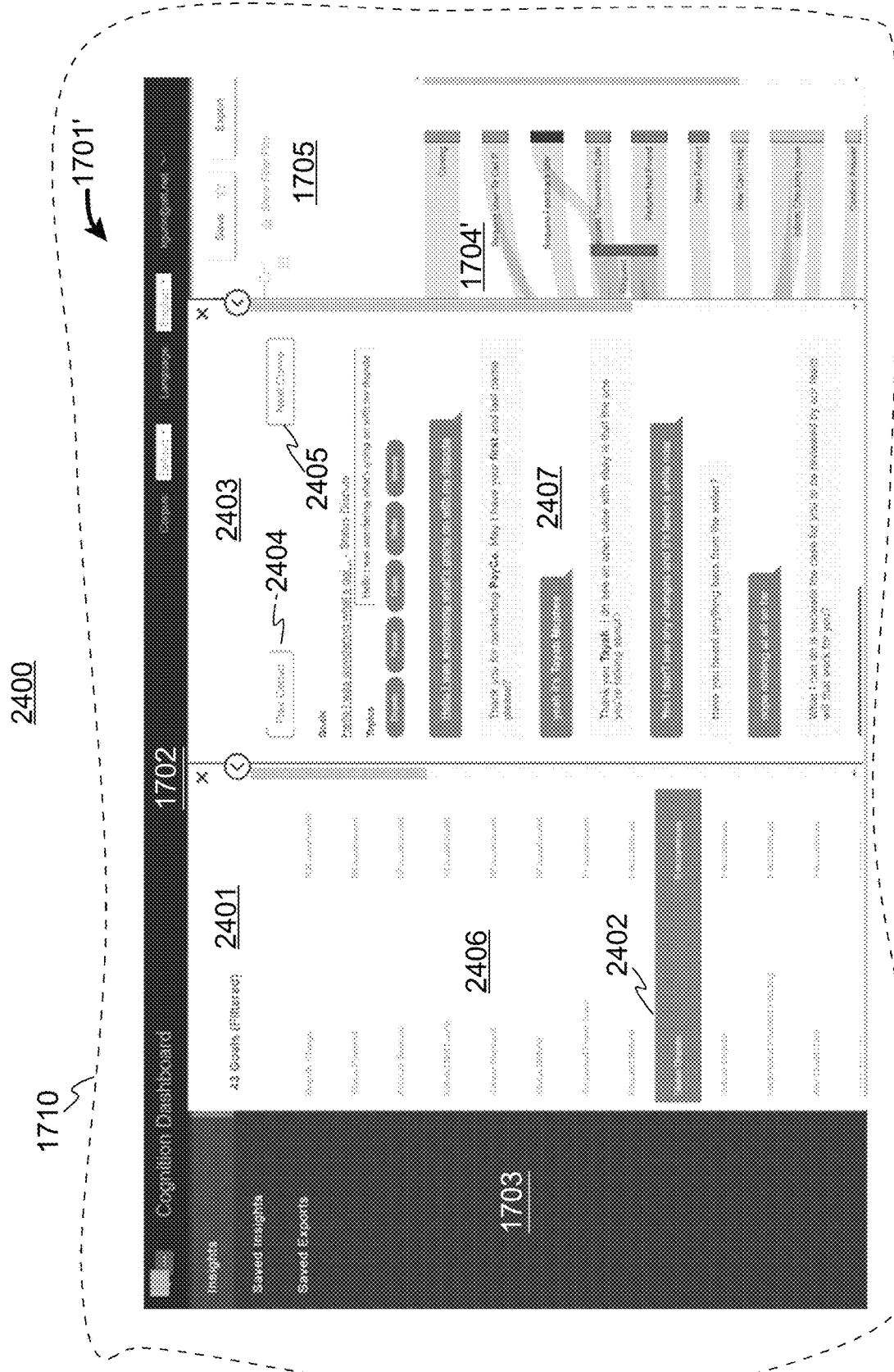
FIG. 24 depicts an example User Interface (UI) which is automatically prepared, rendered and displayed by a computer system using one or more processes according to the present invention, including one or more drill-down dialogs such as the illustrated set of Goals detail drawers.

Further according to the present invention, some embodiments may provide advanced UI functions to allow exploring and drilling-down on details with in the broader corpus itself, and, preferably, within the selected subset of the corpus which meets the current filter criteria, as depicted in FIGS. 23 through 24. The present example embodiment provides Conversation Drawers.

In one manner of invoking this UI advanced function, the user selects (e.g., click, tap, touch, etc.) the Conversation Count 2101, as shown in FIG. 21, in the filter criteria portion 1705 of the UI. Responsive to receipt of this user selection, the system will prepare, render and display, such as by overlaying onto the existing UI, a Conversations Drawer 2301, as shown 2300 in FIG. 23, to a portion of the UI, revealing a list 2306 of the conversations that comprise the current flow-graph which is rendered on the UI.

From this view with the Conversations Drawer 2301 open, the system may receive a user selection (e.g., click, tap, touch, etc.) of any one Goal 2302, responsive to which, the system prepares, renders and displays, such as by overlaying onto the existing UI, an open Conversation Detail drawer 2303, which displays the interlocutor conversation turns 2307. In preferred embodiments, when the list of conversations 2306 in the Conversations Drawer 2301 or the details of the actual conversations 2307 with the present system zoom level precludes displaying the entirety of the contents of the open drawer(s), a scrolling control may be provided to the UI to allow the user to command the system to display additional contents above or below the contents presently shown. Further, according to a preferred embodiment, the UI is rendered with user-selectable controls to navigate in the Conversations Detail drawer 2303 to the next conversation 2305 and to the previous conversation 2304, responsive to selection of which will cause the system to prepare, render and display, such as by overlaying onto the existing UI, the details of the next or previous conversation accordingly.

In another manner of invoking this UI advanced drill-down function, the user selects (e.g., click, tap, touch, etc.) the Goals Count 2102, as shown in FIG. 21, in the filter criteria portion 1705 of the UI. Responsive to receipt of this user selection, the system will prepare, render and display, such as by overlaying onto the existing UI, a Goals Drawer 2401, as shown 2400 in FIG. 24, to a portion of the UI, revealing a summary 2406 of the Goals that comprise the current flow-graph which is rendered on the UI.

From this view with the Goals Drawer 2401 open, the system may receive a user selection (e.g., click, tap, touch, etc.) of any one Goal 2402, responsive to which, the system prepares, renders and displays, such as by overlaying onto the existing UI, an open Goal Detail drawer 2403, which displays the actual occurrences 2307 of conversations during which the customer stated this selected Goal as their goal (Note: there may be multiple goals).

As with the Conversations Drawer and Conversation Detail drawer, the UI may be provided with a scrolling control may be provided to the UI to allow the user to command the system to display additional contents above or below the contents presently shown, as well as provided with user-selectable controls to navigate to the next conversation 2405 and to the previous conversation 2404, responsive to selection of which will cause the system to prepare, render and display, such as by overlaying onto the existing UI, the details of the next or previous conversation accordingly.

Computing Platform

The "hardware" portion of a computing platform typically includes one or more processors accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces may be provided, as well as specialty interfaces for specific applications. If the computing platform is intended to interact with human users, it is provided with one or more user interface devices, such as display(s), keyboards, pointing devices, speakers, etc. And, each computing platform requires one or more power supplies (battery, AC mains, solar, etc.).

Conclusion

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Certain embodiments utilizing a microprocessor executing a logical process may also be realized through customized electronic circuitry performing the same logical process(es). The foregoing example embodiments do not define the extent or scope of the present invention, but instead are provided as illustrations of how to make and use at least one embodiment of the invention.

What is claimed is:

1. A method implemented on a computing device for visualizing, exploring and examining various levels of supporting information details, the method comprising:
   accessing, by a computer processor, a corpus having a plurality of digital weighted conversation models of text-based interlocutory conversations, wherein each digital weighted conversation model contains annotations and paths, and wherein each path in each digital weighted conversation model is associated with a weight;
   selecting, by the computer processor, a plurality of the text-based interlocutory conversations which meet at least one annotation value and in which at least one path meets at least one weight threshold according to the plurality of digital weighted conversation models; and
   generating, by the computer processor, a graphical user interface using the selected plurality of text-based interlocutory conversations, in which:
      one or more interlocutor Goals are depicted as one or more starting points in a flow-graph;
      one or more interlocutor Turns are depicted as intermittent points in the flow-graph; and
      one or more flow pipes are depicted between each interlocutor Goal and each Turn to illustrate one or more text-based interlocutory conversations which traversed a flow from each goal to each Turn;
      wherein each flow pipe is rendered with a width relative to other flow pipes in the flow graph according to each associated weight.

2. The method of claim 1 wherein the generating of the graphical user interface further comprises generating a filters and criteria portion through which user changes to the at least one weight threshold may be received.

3. The method of claim 2 wherein, responsive to receiving user changes via the filters and criteria portion, the steps of selecting and generating are performed again according to the received user changes.

4. The method of claim 2 wherein the filters and criteria portion further comprises one or more filters selected from the group consisting of user-selectable conversation goals within the corpus, user-selectable conversation topics within the corpus, user-selectable conversation turns within the corpus, user-selectable keywords within the corpus, user-selectable annotation level within the corpus, user-selectable command to hide turns within the flow-graph, user-selectable command to highlight dominant paths within the flow-graph, user-selectable maximum number paths to depict within the flow-graph, user-selectable maximum number conversations to depict within the flow-graph, user-selectable maximum number goals to depict within the flow-graph, and a user-selectable filter pills display enablement control.

5. The method as set forth in claim 1 wherein the flow pipes further comprise one or more flow pipes depicted between two Turns to illustrate one or more text-based interlocutory conversations which traversed a flow from one Turn to another Turn, and wherein each flow pipe between two Turns is rendered with a width relative to other flow pipes in the flow graph according to each associated weight.

6. The method as set forth in claim 1 wherein the generating the graphical user interface further comprises:
   providing associated with the graphical user interface a first-level user-selectable control to display a conversations drill-down dialog;
   responsive to a receipt of the first-level user-selectable control, generating and displaying, associated with the graphical user interface, a list of conversations contained within the selected conversations which are presently depicted within the flow-graph.

7. The method as set forth in claim 6 wherein the generating the graphical user interface further comprises:
   providing associated with the graphical user interface a second-level user-selectable control to display a conversations details dialog;
   responsive to a receipt of the second-level user-selectable control, generating and displaying, associated with the graphical user interface, a plurality of details of one or more conversations selected by a user within the list of conversations.

8. The method as set forth in claim 6 wherein the conversations drill-down dialog comprises a drawer-style dialog.

9. The method as set forth in claim 1 wherein the generating the graphical user interface further comprises:
   providing associated with the graphical user interface a first-level user-selectable control to display a Goals drill-down dialog;
   responsive to a receipt of the first-level user-selectable control, generating and displaying, associated with the graphical user interface, a summary of Goals contained within the selected conversations which are presently depicted within the flow-graph.

10. The method as set forth in claim 9 wherein the generating the graphical user interface further comprises:
    providing associated with the graphical user interface a second-level user-selectable control to display a Goals details dialog;
    responsive to a receipt of the second-level user-selectable control, generating and displaying, associated with the graphical user interface, a plurality of details of any actual occurrences of conversations during which an interlocutor stated at least one user-selected Goal as an interlocutor's goal of an associated conversation.

11. The method as set forth in claim 9 wherein the Goals drill-down dialog comprises a drawer-style dialog.

12. A computer program product for visualizing, exploring and examining various levels of supporting information details, comprising:
    one or more tangible, computer readable memories which are not propagating signals per se; and
    program instructions embodied by the one or more tangible, computer readable memories for causing one or more computer processors to, when executed:
       access a corpus in computer memory having a plurality of digital weighted conversation models of text-based interlocutory conversations, wherein each digital weighted conversation model contains annotations and paths, and wherein each path in each digital weighted conversation model is associated with a weight;

select a plurality of the text-based interlocutory conversations which meet at least one annotation value and in which at least one path meets at least one weight threshold according to the plurality of digital weighted conversation models; and generate a graphical user interface using the selected plurality of text-based interlocutory conversations, in which:
one or more interlocutor Goals are depicted as one or more starting points in a flow-graph;
one or more interlocutor Turns are depicted as intermittent points in the flow-graph; and
one or more flow pipes are depicted between each interlocutor Goal and each Turn to illustrate one or more text-based interlocutory conversations which traversed a flow from each goal to each Turn;
wherein each flow pipe is rendered with a width relative to other flow pipes in the flow graph according to each associated weight.

13. The computer program product of claim 12 wherein the program instructions for generating the graphical user interface further comprise program instructions for generating a filters and criteria portion through which user changes to the at least one weight threshold may be received.

14. The computer program product of claim 13 wherein, responsive to receiving user changes via the filters and criteria portion, the selecting and generating are performed again according to the received user changes.

15. The computer program product of claim 13 wherein the filters and criteria portion further comprises one or more filters selected from the group consisting of user-selectable conversation goals within the corpus, user-selectable conversation topics within the corpus, user-selectable conversation turns within the corpus, user-selectable keywords within the corpus, user-selectable annotation level within the corpus, user-selectable command to hide turns within the flow-graph, user-selectable command to highlight dominant paths within the flow-graph, user-selectable maximum number paths to depict within the flow-graph, user-selectable maximum number conversations to depict within the flow-graph, user-selectable maximum number goals to depict within the flow-graph, and a user-selectable filter pills display enablement control.

16. The computer program product of claim 12 wherein the flow pipes further comprise one or more flow pipes depicted between two Turns to illustrate one or more text-based interlocutory conversations which traversed a flow from one Turn to another Turn, and wherein each flow pipe between two Turns is rendered with a width relative to other flow pipes in the flow graph according to each associated weight.

17. The computer program product of claim 12 wherein the program instructions for generating the graphical user interface further comprise program instructions to:
provide, associated with the graphical user interface, a first-level user-selectable control to display a conversations drill-down dialog;
responsive to a receipt of the first-level user-selectable control, generate and display, associated with the graphical user interface, a list of conversations contained within the selected conversations which are presently depicted within the flow-graph.

18. The computer program product of claim 17 wherein the program instructions for generating the graphical user interface further comprise program instructions to:
provide, associated with the graphical user interface, a second-level user-selectable control to display a conversations details dialog;
responsive to a receipt of the second-level user-selectable control, generate and display, associated with the graphical user interface, a plurality of details of one or more conversations selected by a user within the list of conversations.

19. The computer program product of claim 18 wherein the conversations drill-down dialog comprises a drawer-style dialog.

20. The computer program product of claim 12 wherein the program instructions for generating the graphical user interface further comprise program instructions to:
provide, associated with the graphical user interface, a first-level user-selectable control to display a Goals drill-down dialog;
responsive to a receipt of the first-level user-selectable control, generate and display, associated with the graphical user interface, a summary of Goals contained within the selected conversations which are presently depicted within the flow-graph.

21. The computer program product of claim 20 wherein the program instructions for generating the graphical user interface further comprise program instructions to:
provide, associated with the graphical user interface, a second-level user-selectable control to display a Goals details dialog;
responsive to a receipt of the second-level user-selectable control, generate and display, associated with the graphical user interface, a plurality of details of any actual occurrences of conversations during which an interlocutor stated at least one user-selected Goal as the interlocutor's goal of an associated conversation.

22. The computer program product of claim 21 wherein the Goals drill-down dialog comprises a drawer-style dialog.

23. A system for visualizing, exploring and examining various levels of supporting information details, comprising:
one or more computer processors for executing program instructions;
one or more tangible, computer readable memories which are not propagating signals per se, in communication with the one or more computer processors; and
program instructions embodied by the one or more tangible, computer readable memories for causing one or more computer processors to, when executed by the one or more computer processors:
access a corpus in computer memory having a plurality of digital weighted conversation models of text-based interlocutory conversations, wherein each digital weighted conversation model contains annotations and paths, and wherein each path in each digital weighted conversation model is associated with a weight;
select a plurality of the text-based interlocutory conversations which meet at least one annotation value and in which at least one path meets at least one weight threshold according to the plurality of digital weighted conversation models; and
generate a graphical user interface using the selected plurality of text-based interlocutory conversations, in which:
one or more interlocutor Goals are depicted as one or more starting points in a flow-graph;

one or more interlocutor Turns are depicted as intermittent points in the flow-graph; and one or more flow pipes are depicted between each interlocutor Goal and each Turn to illustrate one or more text-based interlocutory conversations which traversed a flow from each goal to each Turn;

wherein each flow pipe is rendered with a width relative to other flow pipes in the flow graph according to each associated weight.

24. The system of claim 23 wherein the program instructions for generating the graphical user interface further comprise program instructions for generating a filters and criteria portion through which user changes to the at least one weight threshold may be received.

25. The system of claim 24 wherein, responsive to receiving user changes via the filters and criteria portion, the selecting and generating are performed again according to the received user changes.

26. The system of claim 24 wherein the filters and criteria portion further comprises one or more filters selected from the group consisting of user-selectable conversation goals within the corpus, user-selectable conversation topics within the corpus, user-selectable conversation turns within the corpus, user-selectable keywords within the corpus, user-selectable annotation level within the corpus, user-selectable command to hide turns within the flow-graph, user-selectable command to highlight dominant paths within the flow-graph, user-selectable maximum number paths to depict within the flow-graph, user-selectable maximum number conversations to depict within the flow-graph, user-selectable maximum number goals to depict within the flow-graph, and a user-selectable filter pills display enablement control.

27. The computer program product of claim 23 wherein the flow pipes further comprise one or more flow pipes depicted between two Turns to illustrate one or more text-based interlocutory conversations which traversed a flow from one Turn to another Turn, and wherein each flow pipe between two Turns is rendered with a width relative to other flow pipes in the flow graph according to each associated weight.

28. The system of claim 23 wherein the program instructions for generating the graphical user interface further comprise program instructions to:

provide, associated with the graphical user interface, a first-level user-selectable control to display a conversations drill-down dialog;

responsive to a receipt of the first-level user-selectable control, generate and display, associated with the graphical user interface, a list of conversations contained within the selected conversations which are presently depicted within the flow-graph.

29. The system of claim 28 wherein the program instructions for generating the graphical user interface further comprise program instructions to:

provide, associated with the graphical user interface, a second-level user-selectable control to display a conversations details dialog;

responsive to the receipt of the second-level user-selectable control, generate and display, associated with the graphical user interface, a plurality of details of one or more conversations selected by a user within the list of conversations.

30. The system of claim 29 wherein the conversations drill-down dialog comprises a drawer-style dialog.

31. The system of claim 23 wherein the program instructions for generating the graphical user interface further comprise program instructions to:

provide, associated with the graphical user interface, a first-level user-selectable control to display a Goals drill-down dialog;

responsive to a receipt of the first-level user-selectable control, generate and display, associated with the graphical user interface, a summary of Goals contained within the selected conversations which are presently depicted within the flow-graph.

32. The system of claim 31 wherein the program instructions for generating the graphical user interface further comprise program instructions to:

provide, associated with the graphical user interface, a second-level user-selectable control to display a Goals details dialog;

responsive to the receipt of the second-level user-selectable control, generate and display, associated with the graphical user interface, a plurality of details of any actual occurrences of conversations during which an interlocutor stated at least one user-selected Goal as the interlocutor's goal of an associated conversation.

33. The system of claim 32 wherein the Goals drill-down dialog comprises a drawer-style dialog.

* * * * *